US012571376B2

(12) United States Patent　　　(10) Patent No.:　　US 12,571,376 B2
Pedretti et al.　　　　　　　　　　(45) Date of Patent:　　\*Mar. 10, 2026

(54) ENERGY STORAGE AND DELIVERY SYSTEM WITH AN ELEVATOR LIFT SYSTEM AND METHOD OF OPERATING THE SAME

(71) Applicant: Energy Vault, Inc., Westlake Village, CA (US)

(72) Inventors: Andrea Pedretti, Thousand Oaks, CA (US); Roland Markus Hänni, Zurich (CH)

(73) Assignee: Energy Vault, Inc., Westlake Village, CA (US)

( \* ) Notice: Subject to any disclaimer, the term of this patent is extended or adjusted under 35 U.S.C. 154(b) by 13 days.

This patent is subject to a terminal disclaimer.

(21) Appl. No.: 18/586,876

(22) Filed: Feb. 26, 2024

(65) Prior Publication Data

US 2024/0418154 A1　　Dec. 19, 2024

Related U.S. Application Data

(60) Continuation of application No. 18/154,694, filed on Jan. 13, 2023, now Pat. No. 11,920,569, which is a (Continued)

(51) Int. Cl.
*F03G 3/00*　　　　(2006.01)
(52) U.S. Cl.
CPC ..................................... *F03G 3/00* (2013.01)
(58) Field of Classification Search
CPC . F03G 3/00; F03G 3/094; F03G 3/087; F03G 3/097; H02K 7/1853; B66C 17/06; B62D 35/007
See application file for complete search history.

(56) References Cited

U.S. PATENT DOCUMENTS

| 1,720,732 A | 7/1929 | Jongedyk |
| 1,822,432 A | 9/1931 | Bradley |

(Continued)

FOREIGN PATENT DOCUMENTS

| CL | 199701049 | 5/1997 |
| CL | 201001028 | 9/2010 |

(Continued)

OTHER PUBLICATIONS

International Search Report and Written Opinion received in International Patent Application No. PCT/US2022/013915, dated May 23, 2022, in 16 pages.

(Continued)

*Primary Examiner* — Julio C. Gonzalez
(74) *Attorney, Agent, or Firm* — Knobbe Martens Olson & Bear LLP

(57)　　　　　ABSTRACT

An energy storage and delivery system includes an elevator operable to move blocks from a lower elevation to a higher elevation to store energy and from a higher elevation to a lower elevation to generate electricity. A winch assembly is movably coupled to a cable that is coupled to the elevator. The winch assembly has planetary gear assemblies, brakes that selectively engage at least a portion of the planetary gear assemblies, and a spool coupled to the cable. A drive shaft extends between a motor-generator and the winch assembly. A brake is operable so that the spool rotates to reel-in the cable to raise the elevator to move a block from a lower elevation to a higher elevation to store energy or so that the spool rotates to reel-out the cable to lower the elevator to move a block from a higher elevation to a lower elevation to generate electricity.

20 Claims, 17 Drawing Sheets

Related U.S. Application Data continuation of application No. 17/809,718, filed on Jun. 29, 2022, now Pat. No. 11,555,484, which is a division of application No. 17/584,849, filed on Jan. 26, 2022, now Pat. No. 11,525,437.

(60) Provisional application No. 63/144,740, filed on Feb. 2, 2021.

(56) References Cited

U.S. PATENT DOCUMENTS

| | | | |
|---|---|---|---|
| 2,547,935 A | 4/1951 | Grabinski | |
| 2,627,176 A | 2/1953 | Levy | |
| 2,924,484 A | 2/1960 | Tolsma | |
| 3,405,278 A | 10/1968 | Ley | |
| 4,018,021 A | 4/1977 | Dow | |
| 4,284,899 A | 8/1981 | Bendiks | |
| 4,381,839 A | 5/1983 | Engler et al. | |
| 4,918,282 A | 4/1990 | Cheek | |
| 5,340,218 A | 8/1994 | Cuthbertson | |
| 5,888,043 A | 3/1999 | Jatcko | |
| 6,282,859 B1 | 9/2001 | Van Der Heijden | |
| 6,557,316 B2 | 5/2003 | Van Der Heijden | |
| 6,866,815 B2 | 3/2005 | Gohres et al. | |
| 6,955,015 B2 | 10/2005 | Manthei | |
| 7,191,710 B2 | 3/2007 | Powell | |
| 7,561,936 B2 | 7/2009 | Matsufuji | |
| 7,712,326 B2 | 5/2010 | Jagusztyn et al. | |
| 7,743,609 B1 | 6/2010 | Brostmeyer | |
| 7,775,571 B2 | 8/2010 | Waisanen | |
| 7,836,646 B2 | 11/2010 | Matsufuji | |
| 7,886,537 B2 | 2/2011 | Jagusztyn et al. | |
| 7,973,420 B2 | 7/2011 | Scott | |
| 8,176,702 B2 | 5/2012 | Adam | |
| 8,465,071 B2 | 6/2013 | Risi et al. | |
| 8,628,289 B1 | 1/2014 | Benedict | |
| 8,667,750 B2 | 3/2014 | Speer | |
| 8,674,527 B2 | 3/2014 | Fyke et al. | |
| 9,059,605 B2 | 6/2015 | Murray et al. | |
| 9,422,108 B2 | 8/2016 | Hognaland | |
| 9,523,201 B2 | 12/2016 | Romanenko | |
| 9,688,520 B1 | 6/2017 | Khalil | |
| 10,683,851 B2 | 6/2020 | Pedretti et al. | |
| 10,788,020 B2 | 9/2020 | Pedretti et al. | |
| 10,830,216 B2 | 11/2020 | Pedretti et al. | |
| 10,837,429 B2 | 11/2020 | Pedretti et al. | |
| 10,935,005 B2 | 3/2021 | Bhargava | |
| 10,961,051 B1 | 3/2021 | Lindbo et al. | |
| 11,011,967 B2 | 5/2021 | Zhang | |
| 11,525,437 B2 | 12/2022 | Pedretti et al. | |
| 11,555,484 B2 | 1/2023 | Pedretti et al. | |
| 11,585,328 B2 | 2/2023 | Pedretti et al. | |
| 11,719,229 B2 | 8/2023 | Pedretti et al. | |
| 11,746,758 B2 | 9/2023 | Pedretti et al. | |
| 11,761,431 B2 | 9/2023 | Pedretti et al. | |
| 11,761,432 B2 | 9/2023 | Pedretti | |
| 11,820,629 B2 | 11/2023 | Pedretti et al. | |
| 11,920,569 B2 * | 3/2024 | Pedretti | F03G 3/094 |
| 12,037,989 B2 | 7/2024 | Pedretti et al. | |
| 12,044,218 B2 | 7/2024 | Pedretti | |
| 12,049,874 B2 | 7/2024 | Pedretti et al. | |
| 12,132,312 B2 | 10/2024 | Pedretti et al. | |
| 12,215,676 B2 | 2/2025 | Pedretti | |
| 12,345,239 B2 | 7/2025 | Pedretti et al. | |
| 2002/0197135 A1 | 12/2002 | Amtzen et al. | |
| 2003/0009970 A1 | 1/2003 | MacDonald et al. | |
| 2003/0019828 A1 | 1/2003 | Choi | |
| 2003/0214135 A1 | 11/2003 | Peloquin | |
| 2003/0215318 A1 | 11/2003 | Buzzoni | |
| 2004/0020145 A1 | 2/2004 | Matsufuji | |
| 2005/0252144 A1 | 11/2005 | MacDonald et al. | |
| 2007/0000246 A1 | 1/2007 | Prastitis | |
| 2007/0186502 A1 | 8/2007 | Marsh et al. | |
| 2007/0193183 A1 | 8/2007 | Price et al. | |
| 2007/0193808 A1 | 8/2007 | Perakes et al. | |

| | | |
|---|---|---|
| 2008/0098687 A1 | 5/2008 | Marsh et al. |
| 2009/0077920 A1 | 3/2009 | Korman et al. |
| 2009/0173027 A1 | 7/2009 | Bennett |
| 2009/0193808 A1 | 8/2009 | Fiske |
| 2009/0200814 A1 | 8/2009 | Hellgren |
| 2009/0231123 A1 | 9/2009 | Rowell et al. |
| 2009/0284021 A1 | 11/2009 | Scott |
| 2010/0283263 A1 | 11/2010 | Schilling |
| 2010/0301616 A1 | 12/2010 | Al-Khamis |
| 2011/0027107 A1 | 2/2011 | Bekken |
| 2011/0037275 A1 | 2/2011 | Peitzke et al. |
| 2011/0050158 A1 | 3/2011 | MacDonal et al. |
| 2011/0112731 A1 | 5/2011 | Harada |
| 2011/0123257 A1 | 5/2011 | Mills et al. |
| 2011/0241356 A1 | 10/2011 | Khoshnevis |
| 2012/0067674 A1 | 3/2012 | Legeret et al. |
| 2012/0272500 A1 | 11/2012 | Reuteler |
| 2012/0306223 A1 | 12/2012 | Karlsson |
| 2013/0125540 A1 | 5/2013 | Vainonen et al. |
| 2013/0241210 A1 | 9/2013 | Chan et al. |
| 2014/0110194 A1 | 4/2014 | Zhu et al. |
| 2014/0271240 A1 | 9/2014 | Daily |
| 2015/0048622 A1 | 2/2015 | Schegerin |
| 2015/0130191 A1 | 5/2015 | Houvener et al. |
| 2015/0285037 A1 | 10/2015 | Sadiq |
| 2016/0032586 A1 | 2/2016 | Radford |
| 2016/0138572 A1 | 5/2016 | Boone |
| 2017/0030069 A1 | 2/2017 | Radford |
| 2017/0038103 A1 | 2/2017 | Torrent |
| 2017/0288457 A1 | 10/2017 | Peitzke et al. |
| 2018/0010582 A1 | 1/2018 | Aranovich et al. |
| 2019/0393756 A1 | 12/2019 | Nehmeh |
| 2020/0044481 A1 | 2/2020 | Soloboev et al. |
| 2020/0109703 A1 | 4/2020 | Bhargava |
| 2020/0290804 A1 | 9/2020 | Fjeldheim |
| 2021/0188549 A1 | 6/2021 | Fjeldheim et al. |
| 2021/0198039 A1 | 7/2021 | Salichs et al. |
| 2021/0214100 A1 | 7/2021 | Thayer |
| 2021/0214199 A1 | 7/2021 | Austrheim |
| 2021/0221618 A1 | 7/2021 | Austrheim |
| 2021/0397769 A1 | 12/2021 | Austrheim et al. |
| 2021/0404447 A1 | 12/2021 | Pedretti et al. |
| 2021/0404448 A1 | 12/2021 | Pedretti et al. |
| 2022/0002076 A1 | 1/2022 | Austrheim |
| 2022/0002077 A1 | 1/2022 | Austrheim et al. |
| 2022/0041372 A1 | 2/2022 | Austrheim |
| 2022/0065231 A1 | 3/2022 | Colt et al. |
| 2022/0073279 A1 | 3/2022 | Austrheim et al. |
| 2022/0097967 A1 | 3/2022 | Austrheim |
| 2022/0161662 A1 | 5/2022 | Fjeldheim |
| 2022/0163018 A1 | 5/2022 | Waller et al. |
| 2022/0228572 A1 | 7/2022 | Franklin et al. |
| 2024/0418154 A1 | 12/2024 | Pedretti et al. |
| 2025/0012259 A1 | 1/2025 | Pedretti |
| 2025/0047098 A1 | 2/2025 | Pedretti et al. |
| 2025/0163896 A1 | 5/2025 | Pedretti et al. |
| 2025/0215860 A1 | 7/2025 | Pedretti |

FOREIGN PATENT DOCUMENTS

| | | |
|---|---|---|
| CL | 201200123 | 1/2012 |
| CL | 63805 | 1/2020 |
| CL | 202103505 | 12/2021 |
| CN | 1671929 A | 9/2005 |
| CN | 101782049 | 7/2010 |
| CN | 101980946 A | 2/2011 |
| CN | 103334887 A | 10/2013 |
| CN | 203404028 U | 1/2014 |
| CN | 103867408 A | 6/2014 |
| CN | 204096953 U | 1/2015 |
| CN | 107628554 A | 1/2018 |
| CN | 109665430 | 4/2019 |
| CN | 110578662 A | 12/2019 |
| CN | 111692055 A | 9/2020 |
| CN | 113460841 A | 10/2021 |
| CN | 114183317 A | 3/2022 |
| DE | 2152879 A1 | 4/1973 |
| DE | 1279906 | 10/1986 |
| DE | 4135440 A1 | 4/1993 |

(56) References Cited

FOREIGN PATENT DOCUMENTS

| | | | |
|---|---|---|---|
| DE | 10037678 | A1 | 2/2002 |
| DE | 102010014342 | A1 | 10/2011 |
| DE | 102011119116 | A1 | 5/2013 |
| DE | 202012102937 | U1 | 11/2013 |
| EA | 27072 | B1 | 6/2017 |
| FR | 1 135 656 | | 5/1957 |
| FR | 2 146 481 | A1 | 3/1973 |
| FR | 2 812 865 | A1 | 2/2002 |
| FR | 3099212 | A1 | 1/2021 |
| GB | 946 930 | A | 1/1964 |
| GB | 2351066 | A | 12/2000 |
| GB | 2578805 | A | 5/2020 |
| GB | 2585124 | A | 12/2020 |
| JP | S63160995 | A | 7/1988 |
| JP | S648197 | A | 1/1989 |
| JP | H05239923 | | 9/1993 |
| JP | 06193553 | | 7/1994 |
| JP | 2001163574 | A | 6/2001 |
| JP | 2004123243 | A | 4/2004 |
| JP | 2004277165 | A | 10/2004 |
| JP | 2006022529 | A | 1/2006 |
| JP | 2009242088 | | 10/2009 |
| JP | 2013501682 | A | 1/2013 |
| JP | 2014034468 | A | 2/2014 |
| KR | 10-0570880 | B1 | 4/2006 |
| KR | 10-2009-0110891 | A | 10/2009 |
| KR | 101036255 | A | 6/2011 |
| RU | 2026252 | C1 | 1/1995 |
| RU | 2585132 | C2 | 5/2016 |
| SU | 481528 | A1 | 8/1975 |
| WO | WO 1992018415 | A1 | 10/1992 |
| WO | WO 2013/050343 | A2 | 4/2013 |
| WO | WO 2013/005056 | A1 | 10/2013 |
| WO | WO 2015/037096 | A1 | 3/2015 |
| WO | WO 2015/039534 | A1 | 3/2015 |
| WO | WO 2015039505 | A1 | 3/2015 |
| WO | WO 2018/013562 | A1 | 1/2018 |
| WO | WO 2018/184868 | A2 | 10/2018 |
| WO | WO 2020/018329 | | 1/2020 |
| WO | WO 2020/040717 | A1 | 2/2020 |
| WO | WO 2020/169474 | A1 | 8/2020 |
| WO | WO 2021/219888 | A1 | 11/2021 |
| WO | WO 2021/255763 | A1 | 12/2021 |
| WO | WO 2021/260450 | A1 | 12/2021 |
| WO | WO 2022/006584 | A1 | 1/2022 |

OTHER PUBLICATIONS

"A Weighting game," International Water Power & Dam Construction, Apr. 13, 2010, 8 pages.
Wood, Bruce; "Hanging Tomato Plants"; Mar. 4, 2009; retrieved May 9, 2013 using Internet Archive to view rubberingot.com.
International Search Report and Written Opinion mailed Feb. 19, 2012, received in International Patent Application No. PCT/US2011/037252, in 9 pages.
International Search Report and Written Opinion dated Feb. 6, 2020, received in International Patent Application No. PCT/US2019/041249.
International Search Report and Written Opinion regarding International Patent Application No. PCT/US2021/014122, dated May 11, 2021, in 12 pages.
International Search Report and Written Opinion dated Nov. 21, 2021, received in International Patent Application No. PCT/US2021/070783, in 20 pages.

* cited by examiner 816
814
810
820
800
330
814
850

330
814
820
800
850

100C

920

924

922

930

930

914

910

930

930

930

912

920

100C

914

924  914

910

912

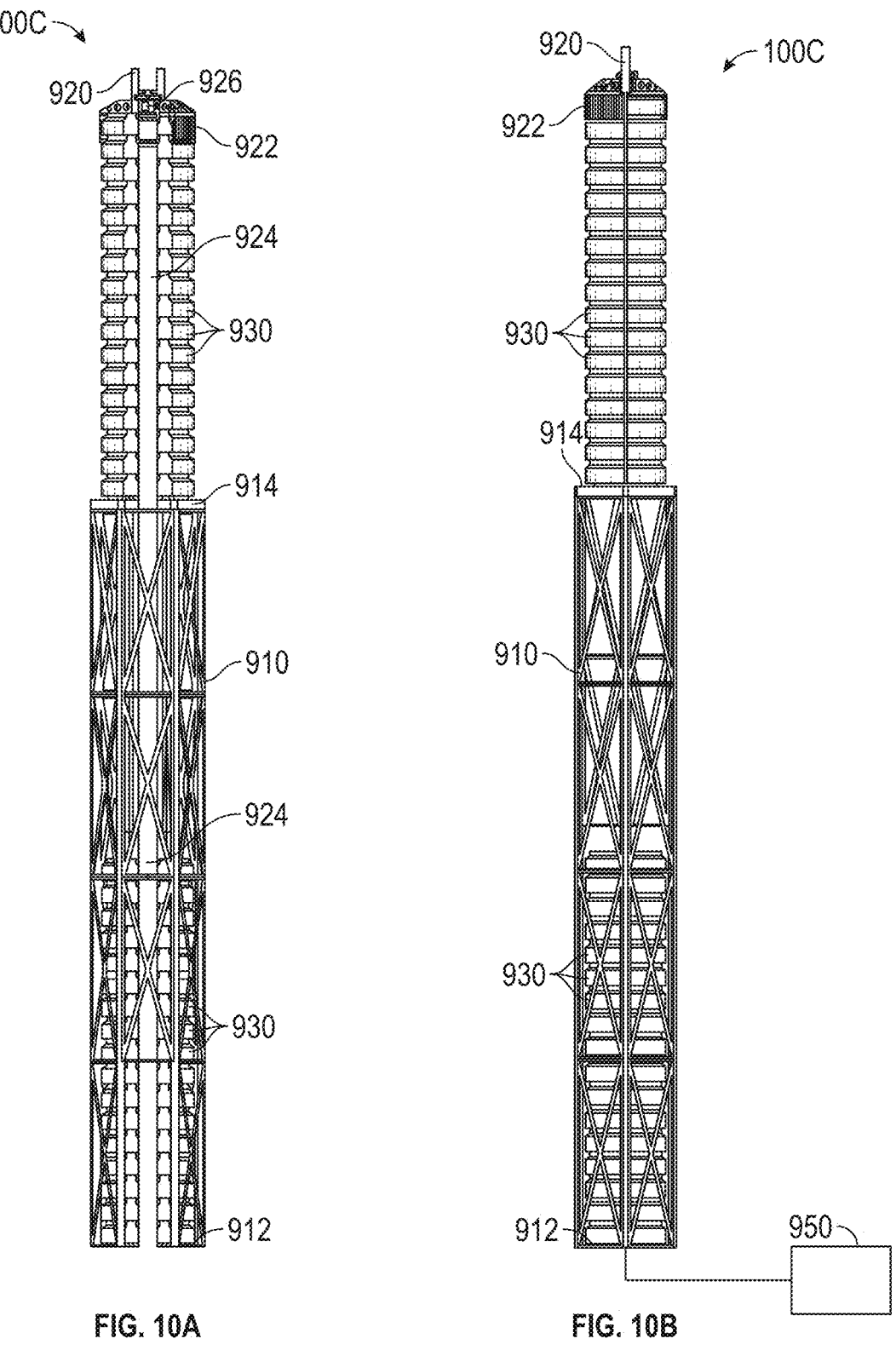
FIG. 10A                    FIG. 10B

FIG. 12A         FIG. 12B

|   A   |   B   |   C   |              |
| :---: | :---: | :---: | ------------ |
|   ∅   |   ∅   |   1   | Stop         |
|   1   |   ∅   |   ∅   | Quick Reverse |
|   ∅   |   1   |   ∅   | Slower Lift  |

1 : Closed          ∅ : Opened

FIG. 16

ENERGY STORAGE AND DELIVERY SYSTEM WITH AN ELEVATOR LIFT SYSTEM AND METHOD OF OPERATING THE SAME

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND

Field

The invention is directed to an energy storage and delivery system, and more particularly to an energy storage and delivery system that stores and releases energy via the vertical movement of blocks or bricks.

Description of the Related Art

Power generation from renewable energy sources (e.g., solar power, wind power, hydroelectric power, biomass, etc.) continues to grow. However, many of these renewable energy sources (e.g., solar power, wind power) are intermittent an unpredictable, limiting the amount of electricity that can be delivered to the grid from intermittent renewable energy sources.

SUMMARY

Accordingly, there is a need for improved system to capture electricity generated by renewable energy sources for predictable delivery to the electrical grid. As used herein, the electrical grid is an interconnected network for delivery of electricity from producers to consumers and spans a large geographical region, including cities, states and/or countries.

In accordance with another aspect of the disclosure, the energy storage and delivery system can in one example store solar power to produce off-hours electricity. The energy storage and delivery system can move a plurality of blocks from a lower elevation to a higher elevation to store solar energy as potential energy in the blocks during daylight hours when solar electricity is abundant. The energy storage system can then operate to move the blocks from the higher elevation to a lower elevation during nighttime to drive a generator to produce electricity for delivery to the power grid. In one implementation, the energy storage system can use a winch having one or more planetary gear assemblies and one or more brakes that advantageously allow for simplified control of the system to raise and lower blocks.

In accordance with another aspect of the disclosure a method for storing and generating electricity is provided. The method comprises operating an elevator on a tower to move a plurality of blocks from a lower elevation on the tower to a higher elevation on the tower to store energy in the blocks, each of the blocks storing an amount of energy corresponding to a potential energy amount of the block. The method also comprises operating the elevator to move the blocks from a higher elevation on the tower to a lower elevation on the tower (e.g., under a force of gravity), thereby generating an amount of electricity corresponding to a kinetic energy amount of said one or more blocks when moved from the higher elevation to the lower elevation.

In accordance with one aspect of the disclosure, an energy storage and delivery system is provided. The energy storage and delivery system comprises one or more modules. Each module comprises a plurality of blocks and a frame having a vertical height above a foundation. The frame includes a lower deck, an upper deck spaced vertically above the lower deck, an elevator shaft disposed between a left column and a right column of the frame that extend between the lower deck and the upper deck, and an elevator movably disposed in the elevator shaft and operatively coupled to an electric motor-generator. The elevator is sized to receive and support one or more blocks therein and operable to travel between a location above the lower deck and a location above the upper deck. The elevator is operable to raise one or more blocks from a location in the left column above the lower deck to a location above the upper deck over the left column, and to move one or more blocks from a location in the right column above the lower deck to a location above the upper deck over the right column to thereby store an amount of electrical energy corresponding to a potential energy amount of said one or more raised blocks. The elevator is operable to lower one or more blocks from a location above the upper deck over the left column to a location within the left column above the lower deck, and to move one or more blocks from a location above the upper deck over the right column to a location within the right column above the lower deck under a force of gravity to thereby generate an amount of electricity for each of the one or more lowered blocks via the electric motor-generator electrically coupled to the elevator.

In accordance with another aspect of the disclosure, a method for storing and generating electricity is provided. The method comprises operating an elevator along an elevator shaft between adjacent left and right columns to move a plurality of blocks between a location above a lower deck in the left or right columns to a location above an upper deck aligned with the left or right columns. Operating the elevator includes one or both of (a) lifting a block from the location above the lower deck in the left or right column, moving the block into the elevator shaft, raising the block to a location above the upper deck, moving the block out of the elevator shaft, and releasing the block to that it is aligned over its prior location in the left or right column to thereby store and amount of electrical energy corresponding to a potential energy amount of said block, and (b) lifting a block from the location above the upper deck and over the left or right column, moving the block into the elevator shaft, lowering the block to a location above the lower deck under a force of gravity, moving the block out of the elevator shaft, and releasing the block to that it is aligned below its prior location and within the left or right column to thereby generate an amount of electricity via an electric motor-generator electrically coupled to the elevator.

In accordance with another aspect of the disclosure, a block for use in an energy storage and generation system is provided. The block comprises a body made of one or more of concrete, steel and compacted dirt. The body has a rectangular shape with a planar top surface and a bottom surface having two or more protrusions that extend across a width of the body. A recess is defined between the two or more protrusions, the two or more protrusions and the recess extending across a width of the body.

In accordance with another aspect of the disclosure, an energy storage and delivery system is provided. The system comprises one or more modules. Each module comprises a plurality of blocks and a frame having a vertical height above a foundation. The frame includes an elevator shaft, and an elevator movably disposed in the elevator shaft, the elevator sized to receive and support one or more blocks therein and operable to move one or more of the plurality of blocks between a lower elevation and a higher elevation. A winch assembly is movably coupled to a cable that is coupled to the elevator, the winch assembly comprising one or more planetary gear assemblies, one or more brakes and a spool coupled to the cable. The one or more modules also comprises a motor-generator and a drive shaft having an end coupled to the motor-generator and an opposite end coupled to the winch assembly. At least one of the one or more brakes of the winch assembly is operable so that the spool rotates to reel-in the cable to raise the elevator to move one or more of the plurality of blocks from a lower elevation to a higher elevation to store energy or so that the spool rotates to reel-out the cable to lower the elevator to move one or more of the plurality of blocks from a higher elevation to a lower elevation to generate electricity.

In accordance with another aspect of the disclosure, a method for storing and generating electricity is provided. The method comprises operating an elevator along an elevator shaft to move a plurality of blocks between a lower elevation and a higher elevation, the elevator coupled to a cable that extends between the elevator and a spool of a winch assembly, the winch assembly comprising one or more planetary gear assemblies and one or more brakes. Operating the elevator includes operating a first brake of the winch assembly to disengage a brake disc of the winch assembly, operating a second brake of the winch assembly to disengage a first ring gear of a first planetary gear assembly and operating a third brake of the winch assembly to engage a second ring gear of a second planetary gear assembly to stop rotation of the spool. Operating the elevator also includes operating the first brake to engage the brake disc of the winch assembly, operating the second brake to disengage the first ring gear of the first planetary gear assembly and operating the third brake to disengage the second ring gear of the second planetary gear assembly to rotate the spool in a reverse direction to reel-out the cable to lower the elevator. Operating the elevator also includes operating the first brake to disengage the brake disc of the winch assembly, operating the second brake to engage the first ring gear of the first planetary gear assembly and operating the third brake to disengage the second ring gear of the second planetary gear assembly to rotate the spool in a forward direction to reel-in the cable to raise the elevator.

BRIEF DESCRIPTION OF THE DRAWINGS

The present invention is illustrated by way of example and not limitation in the figures of the accompanying drawings, and in which:

FIGS. 10A-10B are side views of a rotary energy storage system, in accordance with the fourth embodiment;

FIG. 16 includes a table indicating winch performance based on brake activation.

DETAILED DESCRIPTION

Disclosed herein is an energy storage system that can be operatively coupled to a large-scale electrical grid for stabilizing the electric grid and producing electricity for residential, commercial, and industrial consumers. The energy storage system draws electricity from the grid when supply is readily available, and inputs electricity back into the grid when demand is high. The energy storage system may also be operatively coupled to a solar power plant for purposes of storing electricity during daylight hours and outputting electricity to the grid during nighttime hours. The energy storage system can additionally or alternatively be operatively coupled to a wind power plant or other renewable energy generating plant.

Figure 1:
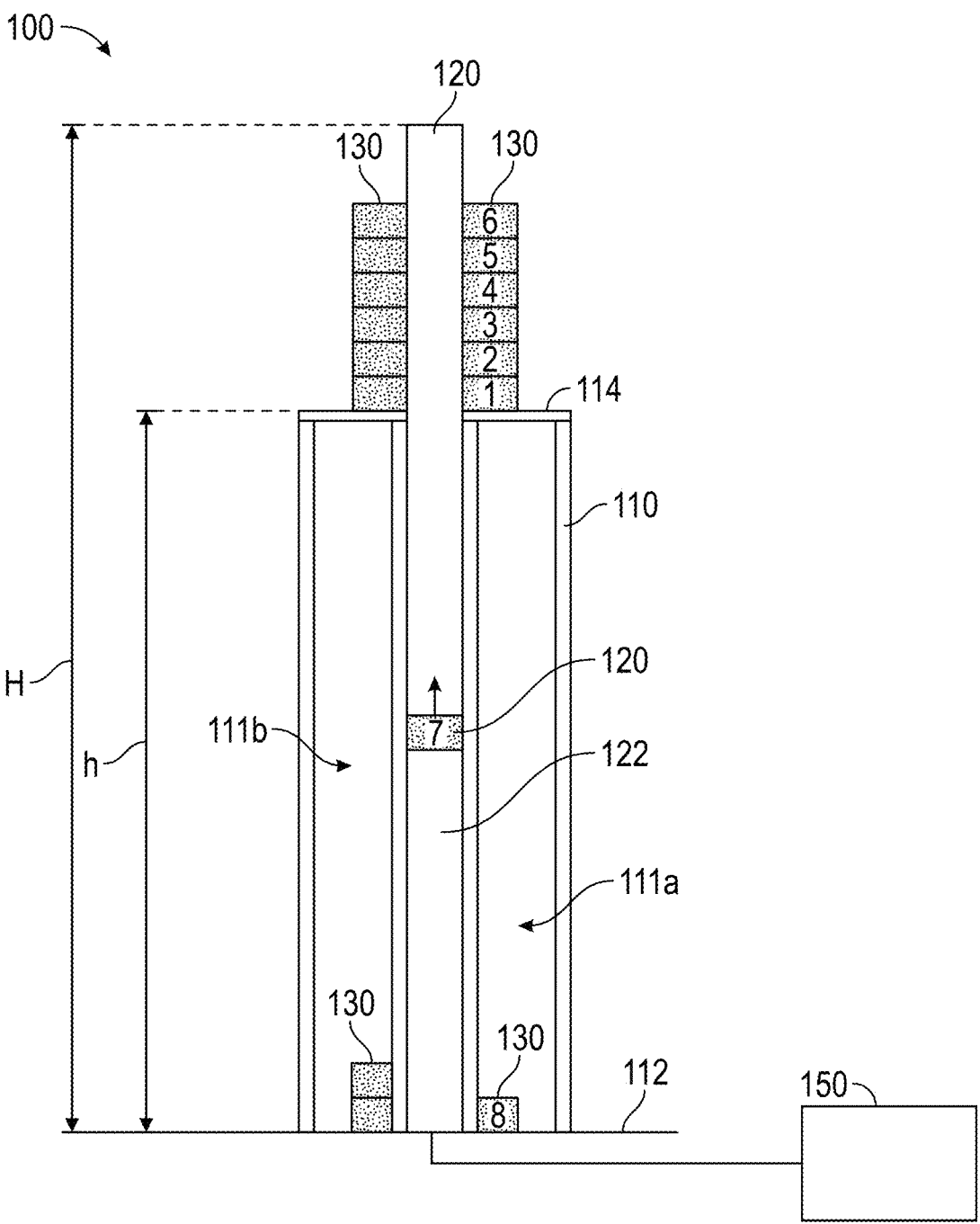
FIG. 1 is a front elevational view of an energy storage system, in accordance with a first embodiment.

FIG. 1 shows a schematic view of one implementation of an energy storage (ES) system 100. The ES system 100 includes a frame 110. In one implementation, the frame 110 can include a plurality of reinforced steel/concrete pillars, a plurality of cross members (not shown), a lower deck 112, an upper deck 114, at least one elevator 120 that travels in an elevator shaft 122, a motor-generator 150, and a plurality of ballast weights or blocks 130. The blocks 130 are stacked and stored on the lower deck 112 and upper deck 114 (e.g., within a column 111a to the right and a column 111b to the right of the elevator shaft 122). The elevator 120 can be operated to move the blocks 130 between a stack on the lower deck 112 and a stack on the upper deck 114 via the elevator shaft 122. The frame 110, blocks 130, elevator shaft 122 and elevator 120 form a module. In the illustrated implementation, the ES system 100 has one module.

To store electricity or other form of energy, a block 130 is lifted by the elevator 120 from the lower deck 112 to the upper deck 114. To release energy and generate electricity, a block 130 is lowered from the upper deck 114 to the lower deck 112 (e.g., under force of gravity) by the elevator 120 (e.g., at a velocity of approximately 0.4 meter/second) and the force used to rotate the motor-generator 150 to generate electricity (e.g., based on the kinetic energy of the block 130 as it is lowered).

In one implementation, some blocks are confined to the upper deck 114 and lower deck 112 to the left of the elevator 120, while other locks are confined to the upper deck 114 and lower deck 112 to the right of the elevator 120. To the right, for example as shown in FIG. 1, there are a total of eight blocks including blocks 1-6 on the upper deck 114, block 7 being moved by the elevator 120 upward to be stacked on block 6 on the right side, and block 8 on the lower deck 112. To store additional energy, block 8 to the right may be raised and stacked on block 7 on the right side. Alternatively, to generate electricity, block 7 to the right may be lowered and stacked on top of block 8 to the right. The process may be repeated as long as there are blocks available to convert energy as required. Advantageously, the same elevator 120 can move blocks 130 on the right side of the elevator shaft 122 between the lower deck 112 and the upper deck 114, and can move blocks 130 on the left side of the elevator shaft 122 between the lower deck 112 and the upper deck 114. Blocks 130 on the left side of the elevator 120 are moved between the lower deck 112 on the left side of the elevator shaft 122 and the upper deck 114 on the left side of the elevator shaft 122, and blocks 130 on the right side of the elevator 120 are moved between the lower deck 112 on the right side of the elevator shaft 122 and the upper deck 114 on the right side of the elevator shaft 122.

Because each block 130 travels between a location at (or above) the lower deck 112 and a location at (or above) upper deck 114 so that the block 130 remains on the same side (e.g., to the left or right of the elevator shaft 122), each of the blocks 130 of the ES system 100 has a different vertical travel distance between the location above the lower deck 112 and the location about the upper deck 114. For example, when all the blocks 130 are on the lower deck 112, the top block 330 in the stack travels a shorter distance to the location above the upper deck 114 than the bottom block 130 in the stack, which must travel from the a location adjacent the bottom deck 112, past the location of the upper deck 114 to a top of the stack on the upper deck 114. Accordingly, each block 130 of the ES system 100 stores a different amount of energy when moved from the above the lower deck 112 to above the upper deck 114 (e.g., the top block 330 in the stack stores the least energy and the bottom block in the stack stores the most energy) and generates a different amount of electricity when moved from above the upper deck 114 to above the lower deck 112 (e.g., the top block 330 in the stack generates the most electricity and the bottom block 130 in the stack generates the least electricity). In one implementation, the elevator 120 can alternatively one block on the left side of the elevator shaft 122 between a position over the lower deck 112 and a position over the upper deck 114, and move one block on the right side of the elevator shaft 122 between a position over the lower deck 112 and a position over the upper deck 114, which can maintain the load on the lower deck 112 and upper deck 114 generally even between the left and right sides of the elevator shaft 122, which can reduce a stress differential on the frame 110.

In one implementation, each block 130 can be approximately 6 meters long, 6 meters wide, and 4 meters tall. However, the block 130 can have other suitable dimensions. The block 130 may be made of concrete, steel, and/or compacted dirt, for example. In one example, the total weight of a block 130 is between about 200 tons and about 300 tons (e.g., metric ton), such as approximately 288 tons (e.g., eight blocks 130 can have a total weight of between about 1600 tons and about 2400 tons, such as about 2304 tons). The height (h) of the upper deck 114 can in one implementation be approximately 88.5 meters, and the overall height (H) of the elevator shaft 122 can in one implementation be approximately 120.5 meters. However, the height (h) of the upper deck 114 and height (H) of the elevator shaft 122 can have other suitable values. The amount of energy storage of the ES system 100 can in one implementation be approximately 500 kWh (kilowatt hours). The amount of power generation provided by the ES system 100 can in one implementation be approximately 1.1 MW. In one implementation, the blocks 130 may weigh as much as 150 metric tons.

Figure 2:
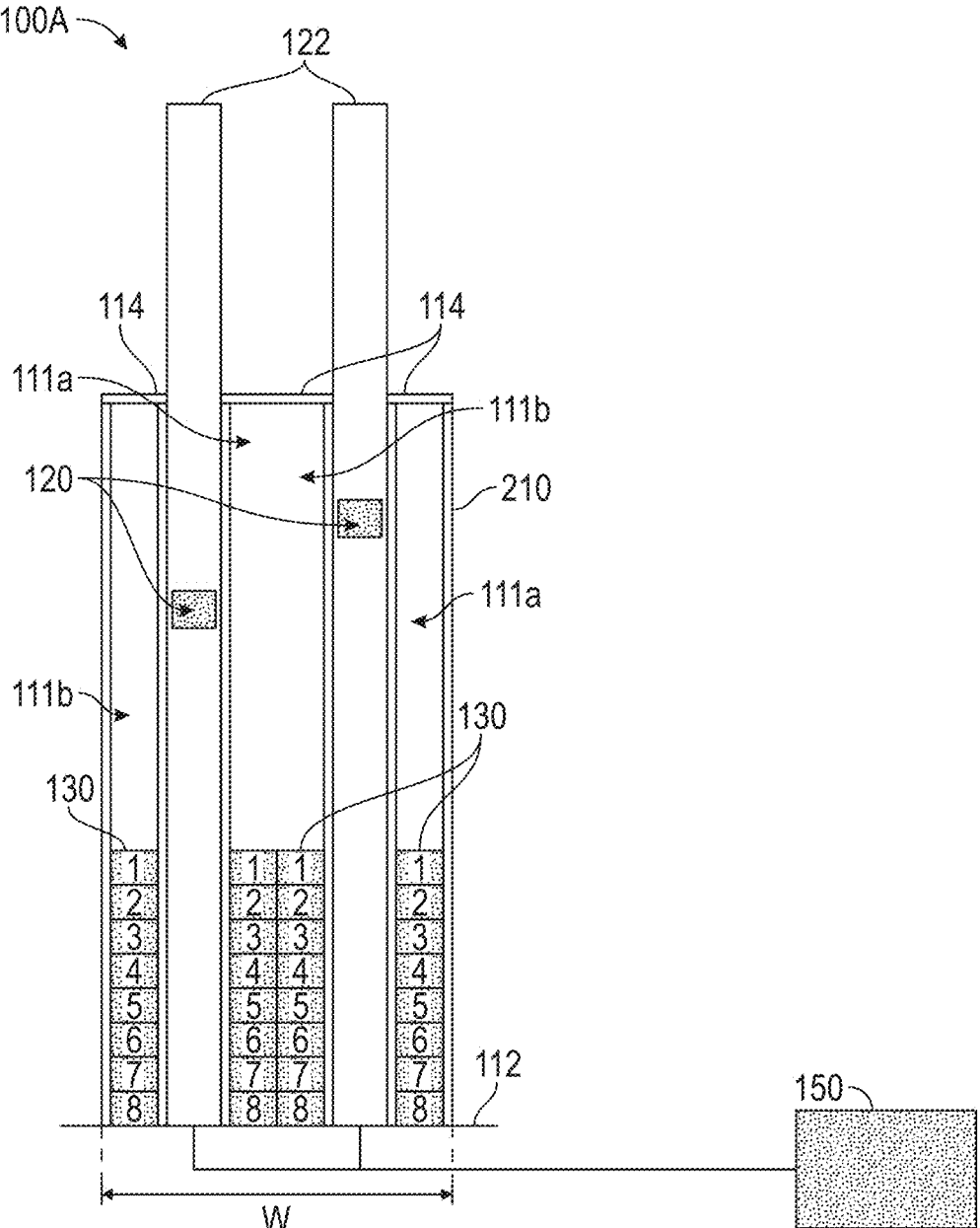
FIG. 2 is a front elevational view of an energy storage system, in accordance with a second embodiment.
Figure 3:
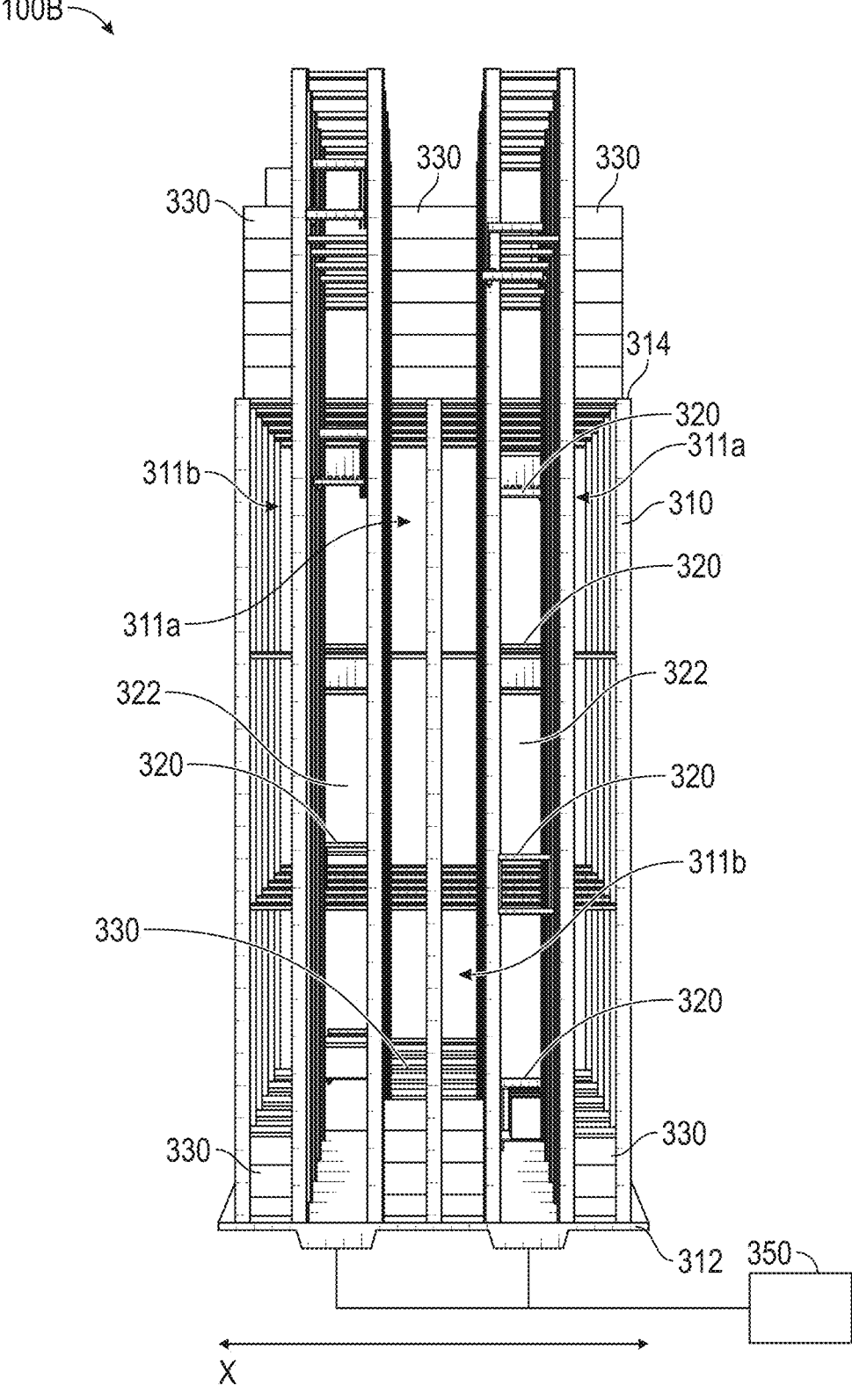
FIG. 3 is a front elevational view of an energy storage system, in accordance with a third embodiment.

FIG. 2 shows a schematic view of a second implementation of an energy storage (ES) system 100A. The ES system 100A is similar to the ES system 100 illustrated in FIG. 1 and described above. Therefore, the structure and description for the various features of the ES system 100 in FIG. 1, and the blocks 130 moved by the ES system 100, are understood to also apply to the corresponding features of the ES system 100A in FIG. 2, except as described below. The ES system 100A differs from the ES system 100 in that it includes two elevators 120 instead of one. Each of the two elevators 120 moves along its corresponding elevator shaft 122 of the frame 210 and services a stack of blocks 130 to its immediate left and immediate right (e.g., blocks are within a column 111a to the right and a column 111b to the right of the elevator shaft 122). The frame 210 can have a width W. In one implementation, the width W can be between about 20 meters and about 40 meters, such as about 36 meters. The blocks 130 (on the immediate left and immediate right of each elevator 120) can be moved between the lower deck 112 and upper deck 114. The ES system 100A operates in the same manner as the ES system 100, but the two elevators 120 of the ES system 100A allow the ES system 100A to store twice as much energy as the ES system 100 and to generated twice as much power (e.g. electricity) on demand as the ES system 100. The frame 110, blocks 130, elevator shafts 122 and elevators 120 form a module. In the illustrated implementation, the ES system 100A has one module.

Figure 4:
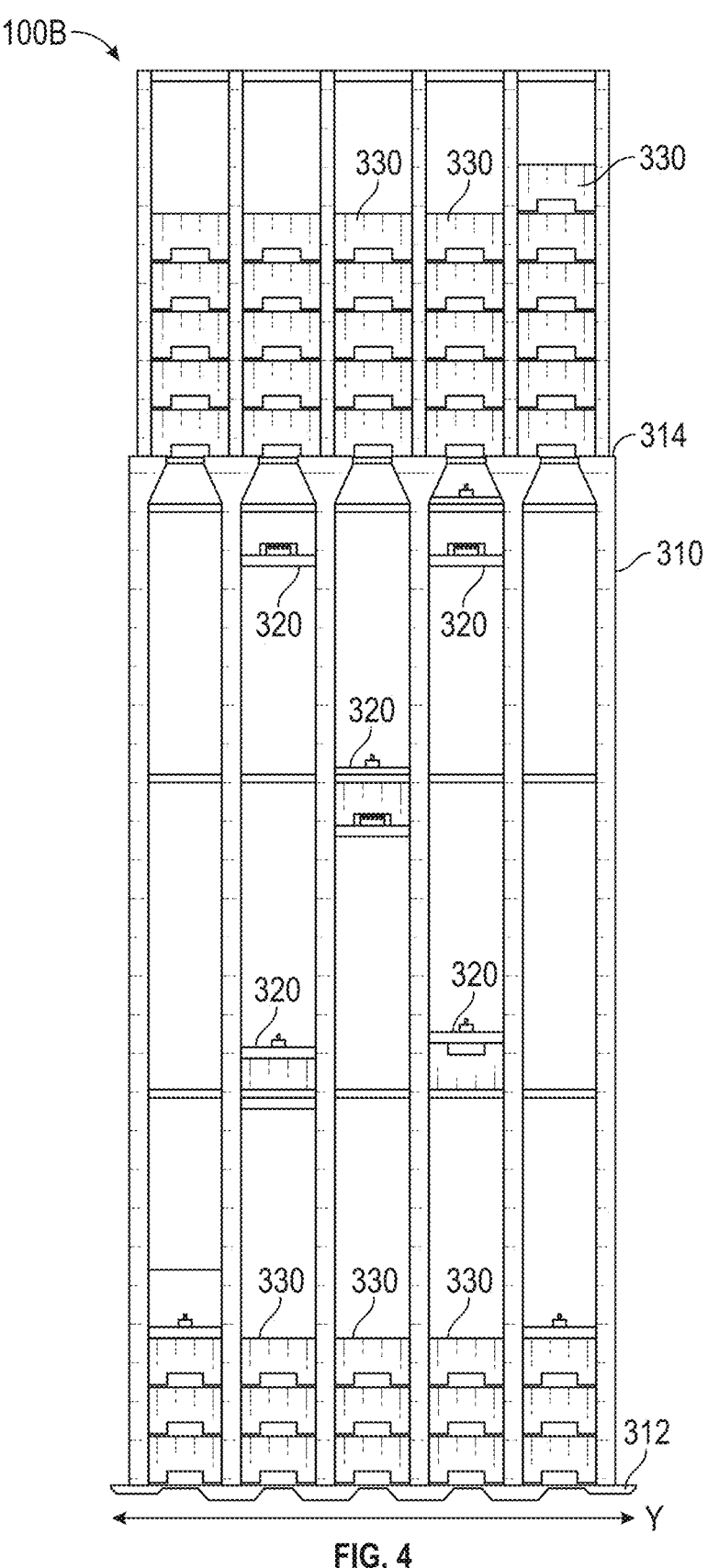
FIG. 4 is a side elevational view of an energy storage system, in accordance with the third embodiment.
Figure 5:
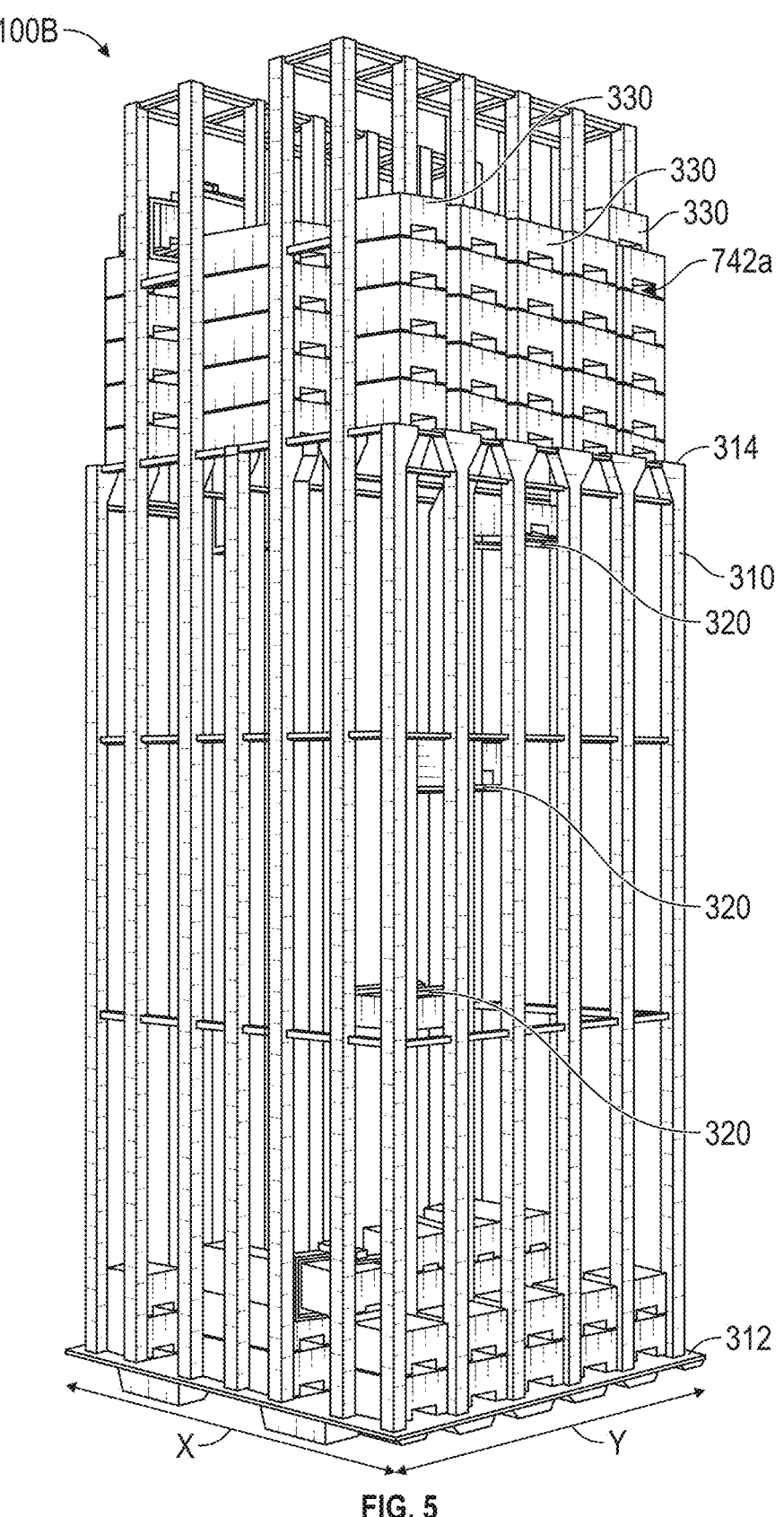
FIG. 5 is a perspective view of an energy storage system, in accordance with the third embodiment.
Figure 6:
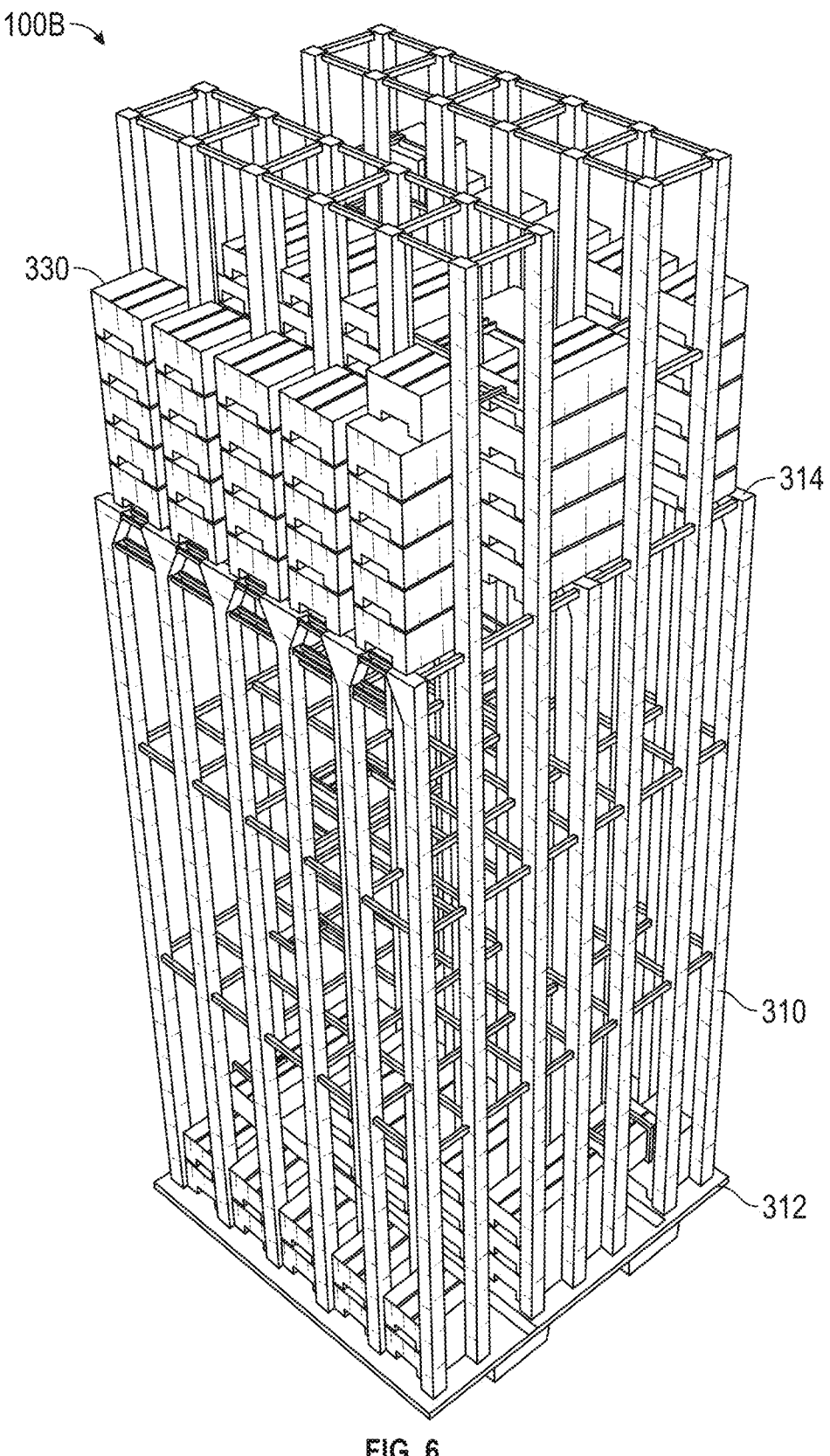
FIG. 6 is a perspective view of an energy storage system, in accordance with the third embodiment.

FIGS. 3-6 illustrate a third implementation of an energy storage (ES) system 100B. The ES system 100B is similar to the ES system 100A illustrated in FIG. 2 and described above, which is similar to the ES system 100 illustrated in FIG. 1 and described above. Therefore, the structure and description for the various features of the ES system 100A in FIG. 2, and the blocks 130 moved by the ES system 100A, are understood to also apply to the corresponding features of the ES system 100C in FIGS. 3-6, except as described below. Like the ES system 100A, the ES system 100B includes a pair of elevators 320 that can each move blocks 330 in the same manner described above for the ES system 100 and 100A (e.g., each elevator 320 can move blocks 330 immediately to the left or right side of the shaft of the elevator 320 between a lower deck 312 and an upper deck 314). For example, the blocks 330 are within a column 311a to the right and a column 311b to the right of the elevator shaft 322. Unlike the ES system 100A, the ES system 100B includes five pairs of elevators standing side by side (e.g., in adjacent elevator shafts in a depth direction or into the page in FIG. 3, or as shown in FIG. 4), thus producing a matrix of elevators 320 that is two elevators wide across the front (e.g., in the X direction in FIG. 3) and five elevators deep (e.g., in the Y direction in FIG. 4). However, the frame 310 can have any suitable number of elevators 320 across the front (e.g., in the X direction in FIG. 3) and any suitable number of elevators 320 in a depth direction (e.g., in the Y direction in FIG. 4). Each elevator 320 can have a stack of blocks 330 to the left and to the right of its associated elevator shaft 322. The blocks 330 to the left and right can be stacked on the lower deck 312 or upper deck 314 and moved between the lower deck 312 and the upper deck 314. The frame 310, blocks 130, elevator shafts 322 and elevators 320 in each vertical plane form a module. In the illustrated implementation, the ES system 100B has five modules.

To store electricity or other form of energy, an elevator 320 descends an elevator shaft 322 to or near (e.g., above) the lower deck 312, picks up a block 330 (e.g., from a stack of blocks 330 on the left side or right side of the elevator shaft 322), carries the block 330 to (or above) the upper deck 314, and deposits the block on a stack of blocks 330 on the upper deck 314 (e.g., on the left side or right side, respectively, so that the block 330 on the upper deck 314 is on the same side it was when it was on the lower deck 312, or above its original position). To release electricity or other form of energy, an elevator 320 ascends an elevator shaft 322 to or near (e.g., above) the upper deck 314, picks up a block 330 (e.g., from a stack of blocks 330 on the left side or right side of the elevator shaft 322), carries the block 330 to (or above) the lower deck 312, and deposits the block 330 on a stack of blocks 330 on the lower deck 312 (e.g., on the left side or right side of the elevator shaft 322, respectively, so that the block 330 on the lower deck 312 is on the same side it was when it was on the upper deck 314, or below its earlier position). The ES system 100B, like the ES system 100A, 100, includes a motor-generator 350 (e.g., similar to the motor-generator 150 in FIGS. 1-2) to lift and lower the blocks 330. By moving the blocks 330 between a location at (or above) the lower deck 312 and a location at (or above) upper deck 314 so that the block 330 remains on the same side (e.g., to the left or right of the associated elevator shaft 322), the ES system 100B, like the ES system 100A, 100, advantageously moves the blocks 330 so that the average load on the frame 310 (e.g., or foundation under the frame 310) is approximately constant during operation of the ES system, thereby inhibiting stresses on the system during operation. Additionally, because each block 330 travels between a location at (or above) the lower deck 312 and a location at (or above) upper deck 314 so that the block 330 remains on the same side (e.g., to the left or right of the associated elevator shaft 322), each of the blocks 330 of the ES system 100B, like those of the ES system 100A, 100, have a different vertical travel distance between the location above the lower deck 312 and the location about the upper deck 314. For example, when all the blocks 330 are on the lower deck 312, the top block 330 in the stack travels a shorter distance to the location above the upper deck 314 than the bottom block 330 in the stack, which must travel from the a location adjacent the bottom deck 312, past the location of the upper deck 314 to a top of the stack on the upper deck 314. Accordingly, each block 330 of the ES system 100B (as each block 130 of the ES system 100, 100A) stores a different amount of energy when moved from the above the lower deck 312 to above the upper deck 314 and generates a different amount of electricity when moved from above the upper deck 314 to above the lower deck 312.

Figure 7:
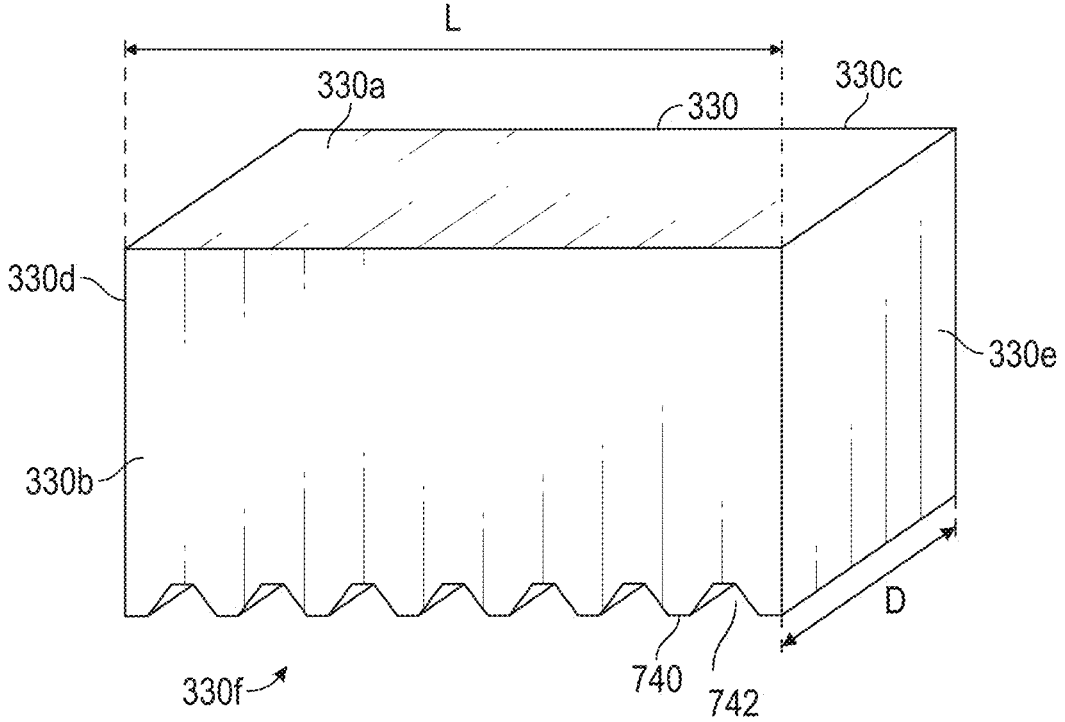
FIG. 7 is a perspective view of a block, in accordance with one embodiment.

FIG. 7 illustrates one implementation of a block 330. In one implementation, the block 130 used with the ES system 100, 100A in FIGS. 1-2 can be similar (e.g., identical) to the block 330 in FIG. 7. In one implementation, the block 330 is rectangular and can optionally have a substantially smooth finish on an upper surface 330a (e.g. planar upper surface), a front side 330b, a back side 330c, a left side 330d and a right side 330e of the block 330. Advantageously, the smooth surface can facilitate movement of a jack (such as the jack 810 described further below) over the upper surface 330a. The bottom surface 330f, in contrast, can in one implementation have a corrugated surface with two or more protrusions 740 and one or more recesses 742 along the length L of the block 330 that run the depth D of the block 330 from the front side 330b to the back side 330c. The protrusions 740 extend downward while the recesses 742 reside above the protrusions 740. The protrusions 740 contact the ground, deck (e.g., lower deck 312, upper deck, 314), other block 330, or other surface on which the block 330 is placed, and the recesses 742 extend above said surface (e.g., extend approximately 10 to 30 centimeters above said surface). In one example, the protrusions 740 are 10 to 30 centimeters tall and define openings that extend across the depth D of the block 330. In another implementation (shown in FIGS. 3-6), the block 330 has two protrusions on the edges of the block 330 so there is one recess 742a (see FIG. 5) between the two protrusions that defines a single opening that extends the depth of the block 330.

In one implementation, each block 330 can be approximately 6 meters long, 6 meters wide, and 4 meters tall (e.g. have a volume of approximately 144 cubic meters). However, the block 330 can have other suitable dimensions. The block 330 may be made of concrete, or compacted dirt or soil, for example. In one example, the total weight of a block 330 is between about 200 tons and about 300 tons (e.g., metric ton), such as approximately 288 tons. The amount of energy storage of the ES system 100B can in one implementation be approximately 500 kWh (kilowatt hours). The amount of power generation provided by the ES system 100B can in one implementation be approximately 1.1 MW.

FIGS. 8A-8D show a block 330 with corrugated underside (e.g., corrugated bottom surface) and a wheeled jack operable to move the block 330. The block 330 is moved from a deck 850 to the elevator 820 and then from the elevator 820 to a different deck 850. The elevator 820 can in one implementation be similar to the elevator 120 in FIGS. 1-2 for the ES system 100, 100A and the elevator 320 in FIGS. 3-6 for the ES system 100B. The deck 850 can be the lower deck 112, 312 or upper deck 114, 314. The jack 810, which can be integrated into the elevator 820, can slide under the block 330, lift the block 330 (as described below), and then roll the block 330 back to the elevator 820, or vice versa. For example, the jack 810 can have one or more fingers sized to extend in the one or more recesses 742 between protrusions 740 on the bottom side 300f of the block 330.

The elevator 820 includes a platform 800 and the jack 810 is movable relative to the platform 800 (e.g., movably coupled or integrated with the elevator 820). The jack 810 includes a housing 811 with multiple wheels 812, one or more (e.g., multiple) lift arms 814, and upper surface 816. The lift arms 814 can optionally be rotatably attached to the housing 811 (e.g., at the upper end of each arm 814). The lower end of each lift arm 814 is connected to one or more of the wheels 812. The lift arms 814 can be rigidly affixed to a motor (e.g., electric motor) or actuator (not shown) that is operable to rotate the lift arms 814 between a vertical orientation and a non-vertical orientation. The overall height of the jack 810 is relatively low when the lift arms 814 are in the non-vertical orientation. When the motor/actuators are energized and the lift arms 814 rotated to the vertical orientation, the lift arms 814 raise the housing 811 and the overall height of the jack 810 is increased so that the upper surface 816 engages and lifts the block 330, thereby allowing the jack 810 to move the block 330.

Figure 8A:
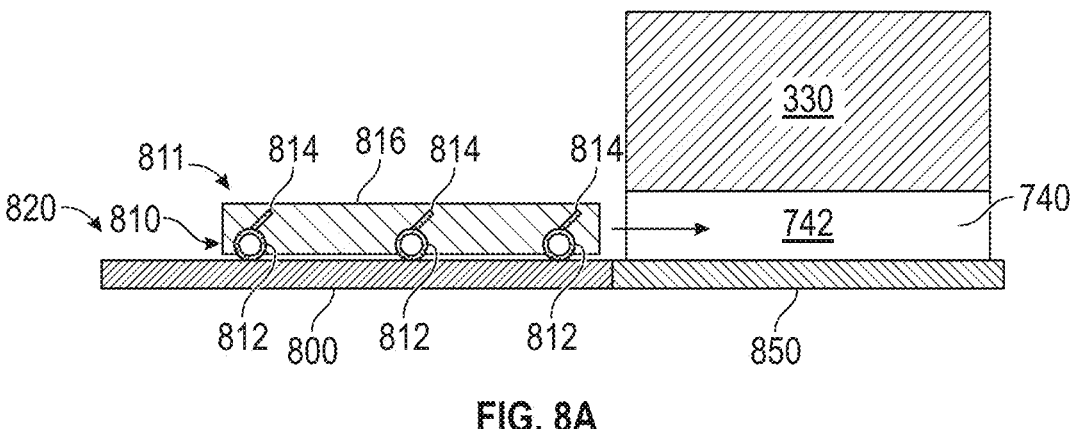
FIG. 8A-8D is a diagrammatic illustration of a block being moved onto an elevator, in accordance with one embodiment.
Figure 8B:
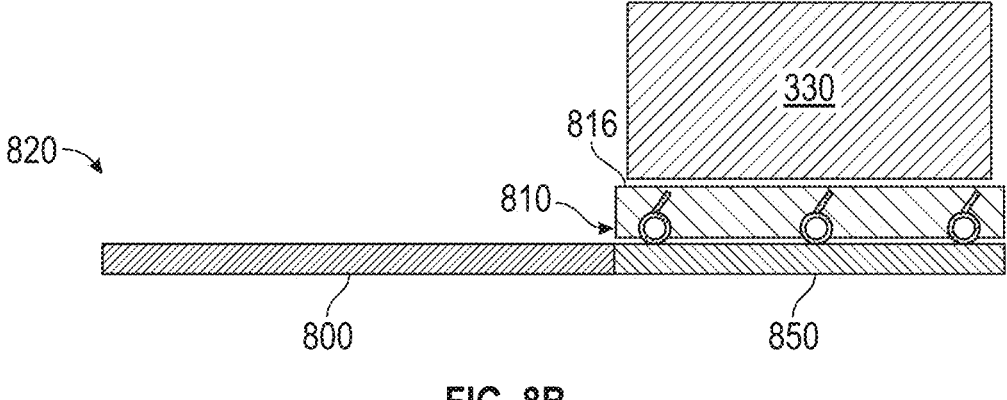
Figure 8C:
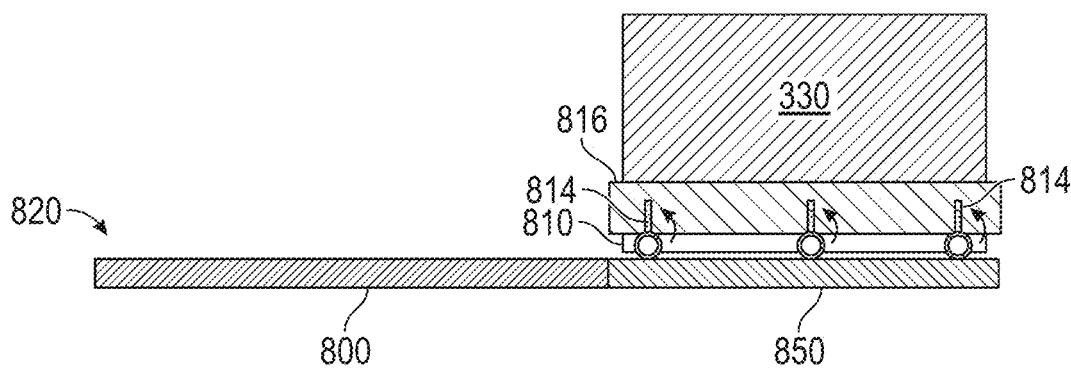
Figure 8D:
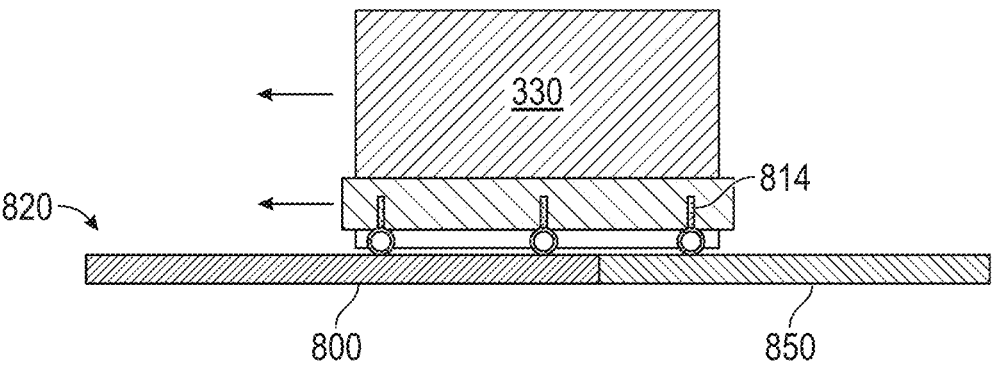
Figures 9A, 9B:
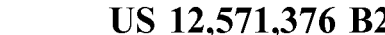
FIGS. 9A-9B are perspective views of a rotary energy storage system, in accordance with a fourth embodiment.
Figure 11:
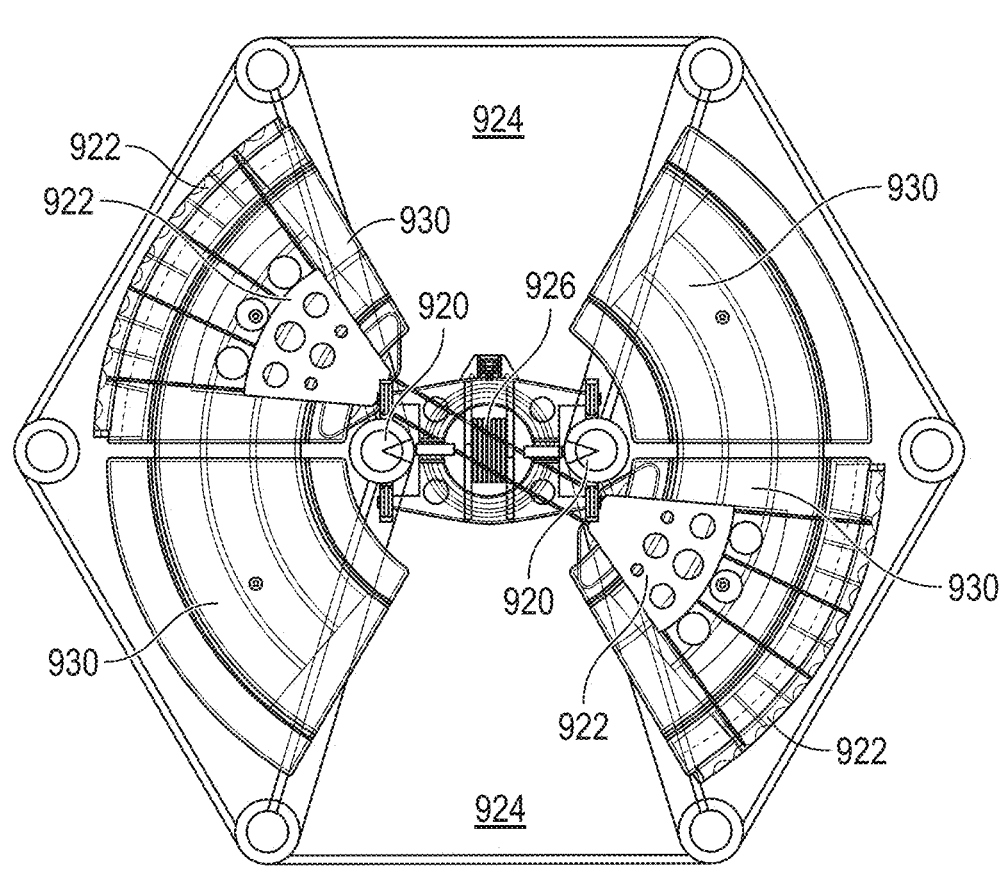
FIG. 11 is a top view of a rotary energy storage system, in accordance with the fourth embodiment.
Figure 12:
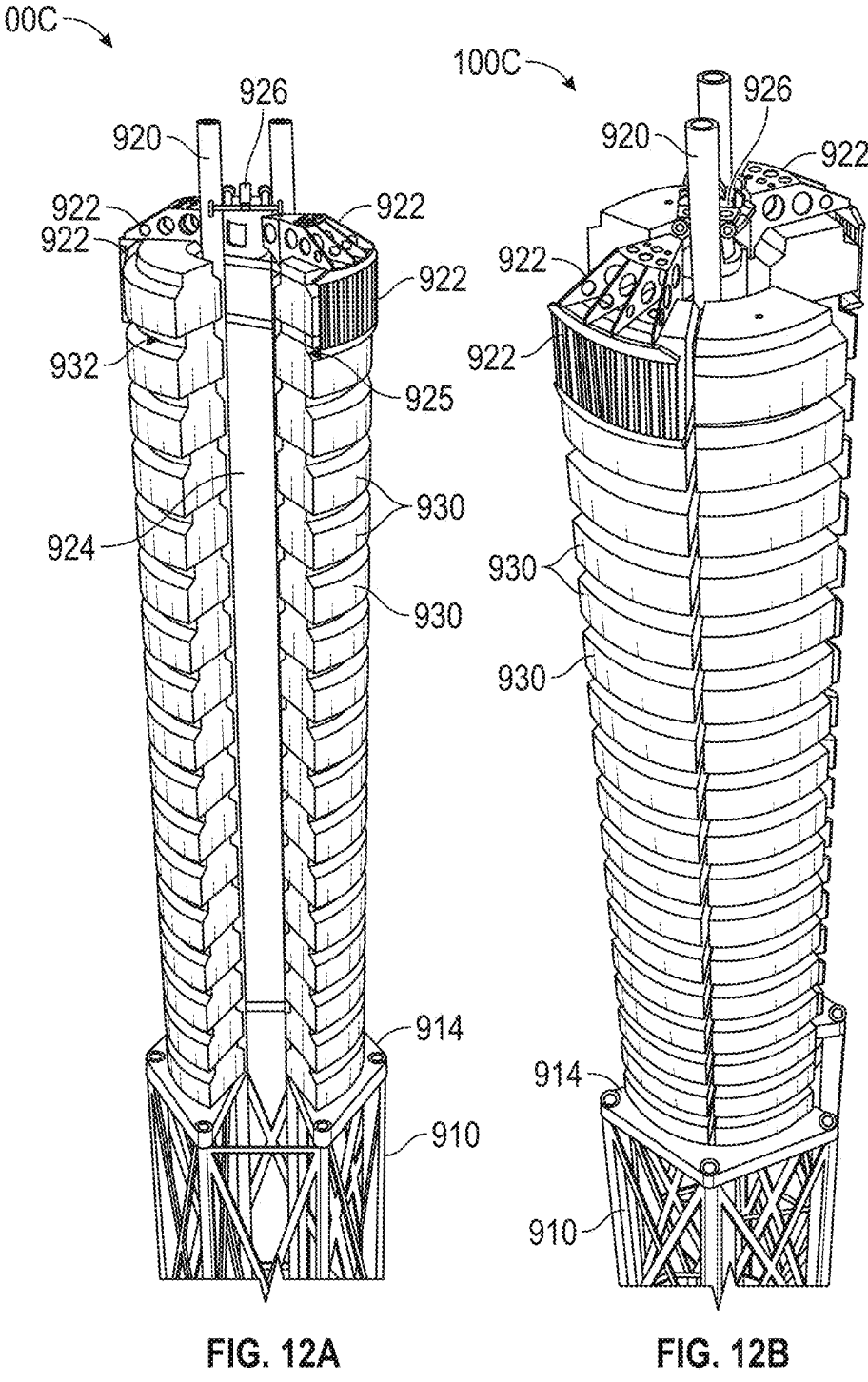
FIGS. 12A-12B are perspective views of a rotary energy storage system, in accordance with the fourth embodiment.

In the process of removing a block 330, the platform 800 can be aligned horizontally with the deck 850 (see FIG. 8A). The jack 810 is rolled toward the block 330 with the lift arms 814 is the non-vertical orientation. The overall height of the jack 810 in this configuration is advantageously less than the height of a recess 742, 742a (e.g., of the corrugated bottom of the block 330). The jack 810 therefore slides under the block 330 between two protrusions 740 (see FIG. 8B) and within one or more recesses 742, 742*a*. Once under the block 330, the lift arms 814 are rotated to a vertical orientation which raises the jack 810 to an overall height greater than the height of the protrusions 740 and/or recesses 742, 742*a*, thereby lifting the block 330 off the deck 850 or off another block (see FIG. 8C). Once lifted, the jack 810 is rolled back onto the elevator platform 800 (see FIG. 8D) and the block 330 relocated to a deck 850 or stack at a different height.

To unload a block 330 from the deck 850, the steps described immediately above are executed in reverse.

FIGS. 9A-12B illustrate a fourth implementation of an energy storage (ES) system 100C. The ES system 100C includes a frame 910. In one implementation, the frame 910 can include a plurality of reinforced steel/concrete pillars with a lower deck 912, an upper deck 914, a plurality of elevator guides 920, at least one elevator 922 (e.g., elevator grabber, elevator cage) operating within elevator shaft 924, a motor-generator 950 with pulleys 926, and a plurality of ballast weights or blocks 930. The blocks 930 can be stacked and stored on the lower deck 912 and on the upper deck 914. The elevator 922 is operable to move the blocks 930 between a stack on the lower deck 912 and a stack on the upper deck 914 via the elevator shaft 924. The blocks 930 can have an arc shape 9 (e.g., be pie-shaped). The frame 910, blocks 930, elevator shaft 924 and elevator 922 form a module. In the illustrated implementation, the ES system 100C has one module.

To store electricity or other form of energy, a block 930 is lifted by the elevator 922 (e.g., elevator grabber) from the lower deck 912 to the upper deck 914. To release energy and generate electricity, a block 930 is lowered from the upper deck 914 to the lower deck 912 (e.g., under force of gravity) and the force used to rotate the motor-generator to generate electricity (e.g., based on the kinetic energy of the block 930 as it is lowered).

The blocks 930 are retrieved, for example, from a stack (e.g., on the lower deck 912 or upper deck 914) and returned to a stack (e.g., on the upper deck 914 or the lower deck 912) using a rotational motion (e.g., rotating the elevator 922 to the left or right relative to the elevator shaft 924 to retrieve or release blocks). If, for example, a block 930 is removed from above the lower deck 912 (e.g., removed from above a stack of blocks 930 on the lower deck 912), the elevator 922 (e.g., elevator grabber) securely grabs the block 930 (e.g., via a lip 925 of the elevator 922 that engages a shoulder 932 of the block 930), (optionally lifts and) rotates (e.g., by 90 degrees) the block 930 (e.g., in a first direction) from its position over the lower deck 912 to an angular position corresponding to the elevator shaft 924, raises the block 930 to a point above the upper deck 914 (e.g., coinciding with the top of a stack of blocks 930 on the upper deck 914), rotates the block (e.g., in a second direction opposite the first direction) to a position directly over the stack of blocks 930, and then releases the block 930 so that is rests on the top of the stack of blocks 930 on the upper deck 914. Similar rotational motion is used by the elevator 922 (e.g., elevator grabber) to pick up a block 930 from above the upper deck 914 (e.g., from above a stack of blocks 930 on the upper deck 914) and place it over the lower deck 912 (e.g., place it at the top of a stack of blocks 930 on the lower deck 912). The rotational motion described herein refers to a rotation in a horizontal plane with respect to a vertical axis coinciding with a longitudinal axis running through the elevator guides 920 of the frame 910.

In some embodiments, the motor-generator (not shown) resides on or near the ground and connects to the elevator (e.g., elevator grabber) 922 via the pulleys 926 mounted at the top of the tower guides 920.

Figure 13:
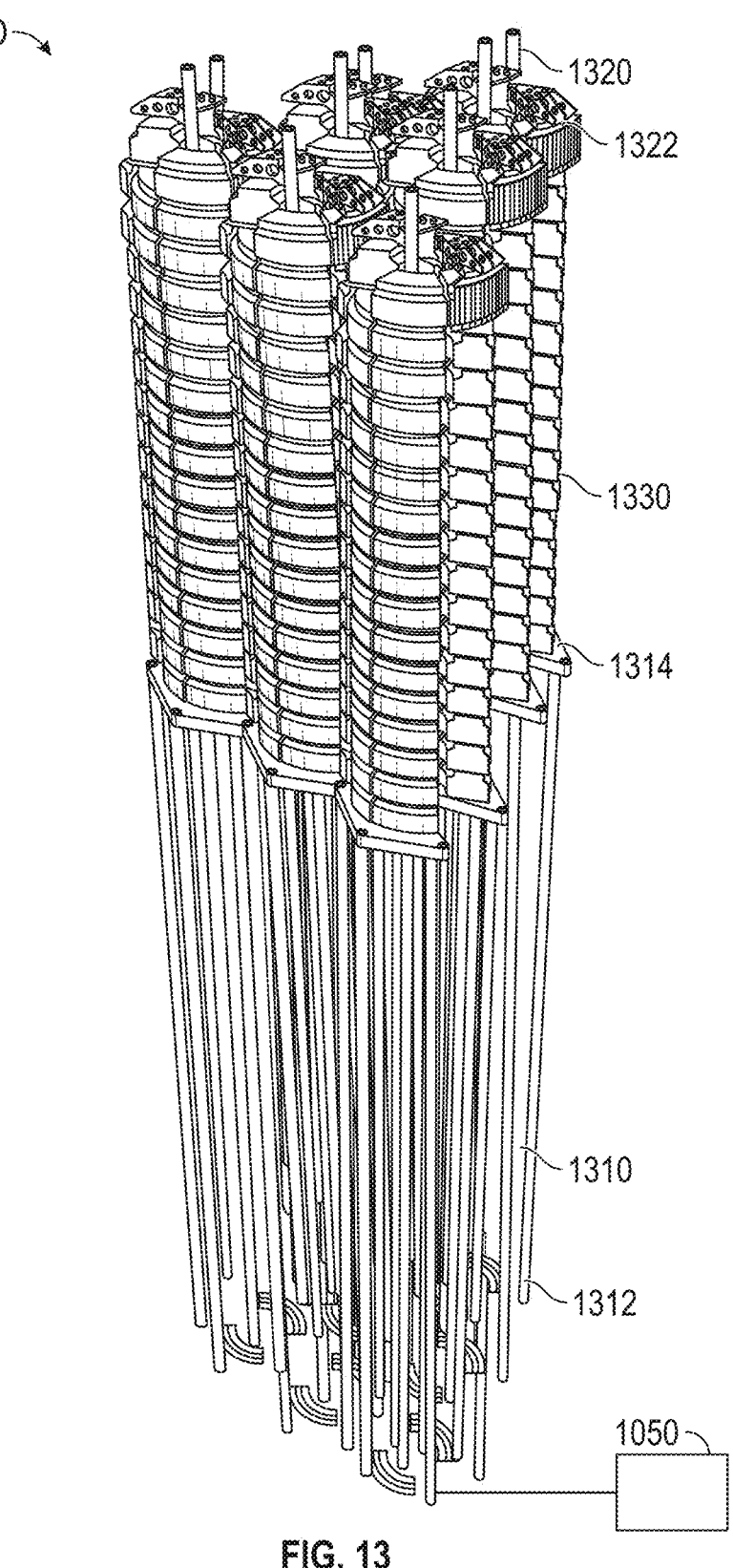
FIG. 13 is a perspective views of a rotary energy storage system, in accordance with a fifth embodiment.

FIG. 13 illustrates a fifth implementation of an energy storage (ES) system 100D. The ES system 100D is similar to the ES system 100C illustrated in FIGS. 9A-12B and described above. Therefore, the structure and description for the various features of the ES system 100C in FIGS. 9A-12B, and the blocks 930 moved by the ES system 100C, are understood to also apply to the corresponding features of the ES system 100D and blocks 1330 in FIG. 13, except as described below. The ES system 100D differs from the ES system 100C in that it includes five frames 1310, each having a pair of elevators 1322, instead of the two frames 910, each having two elevators 922, in FIGS. 9A-12B. The ES system 100D can therefore store more energy than the ES system 100C, and can generate more electricity than the ES system 100C. Each of the five frames 1310 of the ES system 100D can include a plurality of reinforced steel/concrete pillars with a plurality of lower decks 1312 and a plurality of upper decks 1314, a plurality of elevator guides 1320, a plurality of elevators (e.g., elevator grabbers) 1322, a plurality of motor-generators 1050, and a plurality of ballast weights or blocks 1330. The ES system 100D can operate in the same manner as the system 100C to move blocks between the lower decks 1312 and the upper decks 1314 (e.g., by using rotational motion to remove a block 1330 from above a deck or stack of blocks on a deck, rotate the block in one direction to an elevator shaft, move the block to a different elevation, rotate the block in an opposite direction and place the block over a different deck or over a stack of blocks on said deck). Each frame 1310, blocks 1330, elevator shaft and elevator 1322 form a module. In the illustrated implementation, the ES system 100D has five modules.

Figure 14:
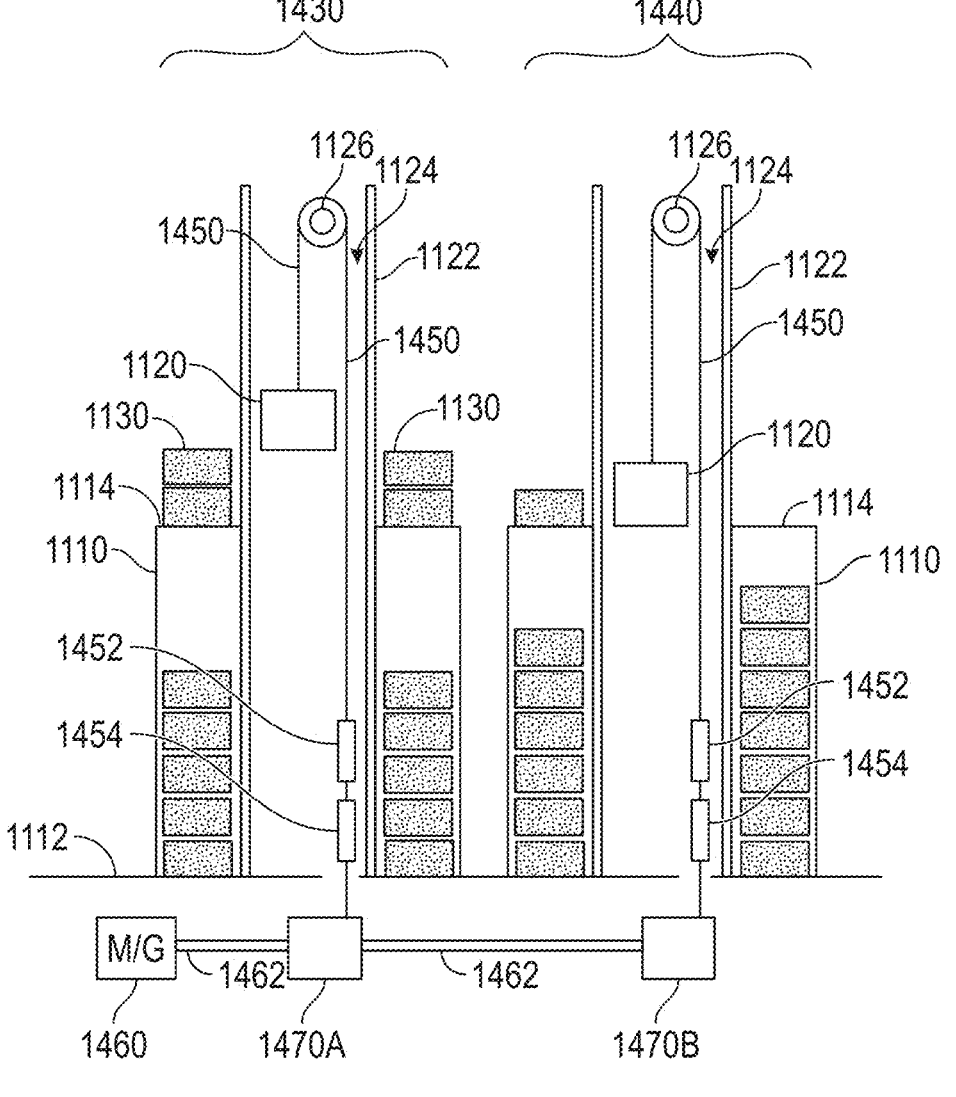
FIG. 14 is a diagrammatic illustration of a motor-generator coupled to a plurality of energy storage systems.

FIG. 14 is a diagrammatic illustration of a motor-generator 1460 coupled to a plurality of energy storage (and delivery) (ES) systems including a first ES system 1430 and second ES system 1440. The ES systems 1430, 1440 are similar to the energy storage system 100A, 100B described above and blocks 1130 are similar to blocks 330. Therefore, the structure and description for the various features of the ES system 100A, 100B and the blocks 330 in FIGS. 2-6, as well as their operation, are understood to also apply to the corresponding features of the ES system 1430, 1440 and block 1130, except as described below. Though the illustrated embodiment shows the motor-generator 1460 as coupled to two energy storage systems 1430, 1440, one of skill in the art will recognize that in other implementations the motor-generator 1460 can be coupled to only one energy storage system. In still another implementation, the motor-generator 1460 can be coupled to more than two energy storage systems (e.g., to four energy storage systems, six energy storage systems, eight energy storage systems).

The motor-generator 1460 can be operated to lift and/or lower blocks 1130 on a plurality of ES systems 1430, 1440 simultaneously. That is, the motor-generator 1460 is operable to lift a block 1130 along an elevator shaft 1124 in a column 1122 of one ES system 1430 (e.g., to a location above an upper deck 1114 of the frame 1110 of the ES system) while a block 1130 is lowered along an elevator shaft 1124 in a column 1122 on a different ES system 1440 (e.g., to a location above a lower deck 1112 of the frame 1110 of the ES system), thereby causing blocks 1130 in the ES systems 1430, 1440 to be lifted and lowered concurrently.

Each ES system 1430, 1440 includes a winch 1470A, 1470B coupled to the motor-generator 1460 via a drive shaft 1462 to lift and lower the blocks 1130. Each ES system 1430,1440 further includes a cable 1450 that runs up the elevator shaft 1124, over a pulley 1126, and back down to an elevator (e.g., elevator grabber) 1120. The cable 1450 may further include a damper 1452 and linear actuator 1454 mounted between the winch 1470A, 1470B and pulley 1126. The damper 1452 can optionally be a hydraulic damper. In another implementation, the damper 1452 can be a pneumatic damper. In still another implementation, the damper 1452 can be a resilient damper (e.g., include a compressible material, such as rubber). The damper 1452 can advantageously absorb jerky motion in the cable 1450 and inhibit (e.g., prevent) excessive forces from damaging the cable 1450. The linear actuator 1454 can expand or contract a small distance (e.g., less than several meters, such as less than 3 meters, less than 2 meters) to make fine adjustments in the vertical position of the elevator (e.g., elevator grabber) 1120 when in motion to pick-up or drop-off a block 1130.

When a block 1130 is being lifted, the associated winch (e.g., winch 1470A and/or 1470B) draws power from the motor-generator 1460 via the drive shaft 1462. When a block 1130 is being lowered, the winch (e.g., winch 1470A and/or 1470B) inputs power into the motor-generator via the drive shaft 1462. The motor-generator 1460 is operable to output power to lift a block 1130 on one ES system (e.g., ES system 1430) while a receiving power when a block 1130 is lowered on a different ES system (e.g., ES system 1440), thereby causing the motor-generator 1460 to output power and receive power concurrently. Power received by the motor-generator 1460 can optionally be delivered to a power grid to which the motor-generator 1460 is electrically connected.

Figure 15:
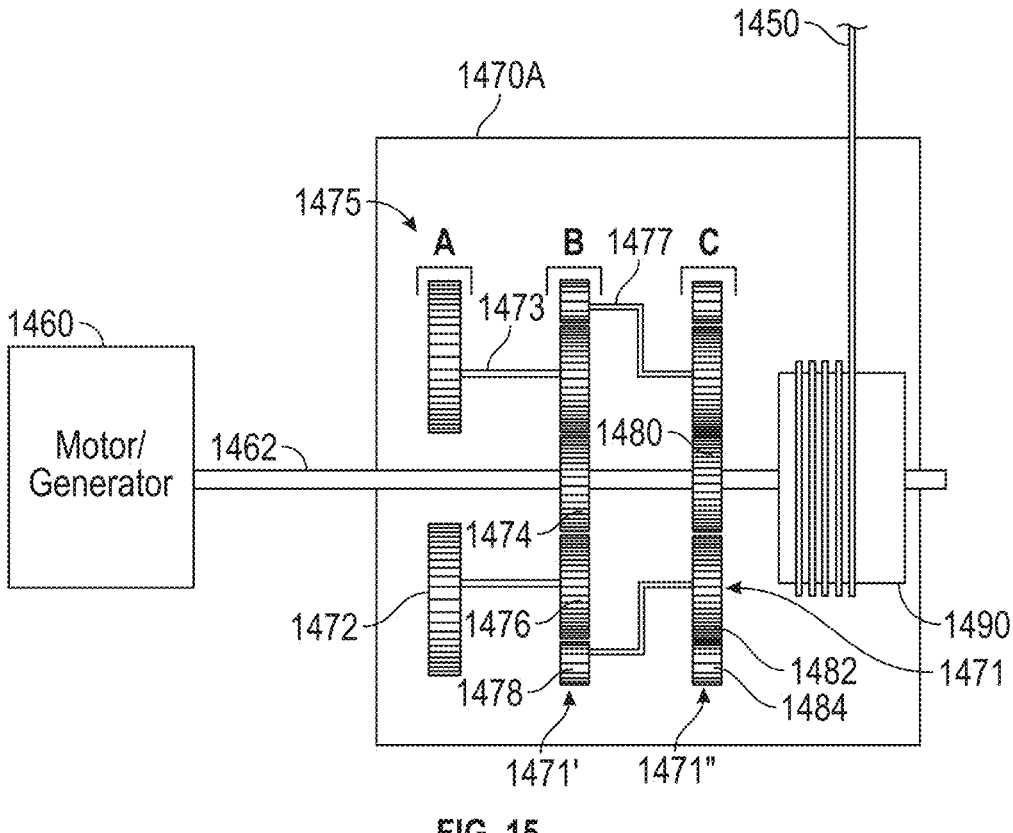
FIG. 15 is a diagrammatic illustration of a winch.

FIG. 15 is a diagrammatic illustration of a winch 1470A. The winch 1470A is substantially identical (e.g., identical) to the winch 1470B, so the features illustrated in FIG. 15 for winch 1470A and described below are understood to apply to winch 1470B. The winch 1470A includes a plurality of planetary gears 1471, a plurality of brakes 1475, and a spool 1490 to reel in or reel out the cable 1450. The plurality of planetary gears 1471 includes a first set of planetary gears 1471' with a first sun gear 1474, a first pair of planet gears 1476, and a first ring gear 1478, where the planet gears 1476 are arranged between the first sun gear 1474 and the first ring gear 1478. The plurality of planetary gears 1471 also includes a second set of planetary gears 1471" with a second sun gear 1480, a second pair of planet gears 1482, and a second ring gear 1484, where the planet gears 1482 are arranged between the second sun gear 1480 and the second ring gear 1484. The winch 1470A further includes a brake disc 1472 that is concentric with the drive shaft 1462.

The brake disc 1472 is affixed to the first pair of planet gears 1476 by one or more members 1473, so that the brake disc 1472 rotates (e.g., about the first sun gear 1474) at the same speed as the first pair of planet gears 1476. In addition, the first ring gear 1478 is affixed by one or more members 1477 to the second pair of planet gears 1482, so that the first ring gear 1478 rotates (e.g., about the second sun gear 1480) at the same speed as the second pair of planet gears 1482.

First brake A (e.g., brake pad(s) that selectively engage the disc 1472) is operable to slow or stop the rotation of the brake disc 1472 as well as the first pair of planet gears 1476. Second brake B (e.g., brake pad(s) that selectively engage the first ring gear 1478) is operable to slow or stop the rotation of the first ring gear 1478 as well as the second pair of planet gears 1482. Third brake C (e.g., brake pad(s) that selectively engage the second ring gear 1484) is operable to slow or stop the rotation of the second ring gear 1484. In one implementation, one or more of the first brake A, second brake B and third brake C can be hydraulically operated brakes. In another implementation, one or more of the first brake A, second brake B and third brake C can be pneumatically operated brakes FIG. 16 includes a table indicating the performance of a winch (e.g. winch 1470A, 1470B) based on activation of one or more of the first brake A, second brake B and/or third brake C. In the table, a "1" indicates that a brake force is actively braking while a "0" indicates that the brake is open and no braking force is applied. As indicated, the spool 1490 is stopped when brake C applies a brake force to the second ring gear 1484 while brakes A and B are open (e.g., no braking force is applied by brakes A and B). The spool 1490 operates in reverse when brake A applies a brake force to the brake disc 1472 while brakes B and C remain open (e.g., no braking force is applied by brakes B and C). When the spool 1490 operates in reverse, the elevator (e.g., elevator grabber) 1120 (and block 1130 carried by it) is lowered. The spool 1490 operates in the forward direct to lift the elevator (e.g., elevator grabber) 1120 (and block 1130 carried by it) when brake B applies a brake force to the first ring gear 1478 while brakes A and C remain open (e.g., no braking force is applied by brakes A and C). Advantageously, the plurality of planetary gears 1471 and brakes A, B, C allow the winch 1470A (as well as the winch 1470B) to operate to raise or lower the elevator 1120 without requiring complex motor controls, thereby providing a simplified and less costly control for raising and lowering the blocks 1130. Though described in connection with the ES system 1430, 1440 above, the motor-generator 1460, winch 1470A, 1470A and drive shafts 1462 in FIGS. 14-15, and operation mode in FIG. 16, can be implemented in any of the energy storage and delivery systems 100-100D described above.

To convert the stored potential energy to electricity, the elevator 120, 320, 820, 922, 1322, 1120 can move one or more of the blocks 130, 330, 930, 1330, 1130 from a higher elevation to a lower elevation (e.g., vertically lower at least partially under the force of gravity) to drive the electric motor-generator 150, 350, 950, 1050, 1460 (via one or more cables or steel ribbons) to generate electricity, which can be delivered to a power grid to which the motor-generator 150, 350, 950, 1050, 1460 is electrically connected. Power in the form of electricity is generated each time a block 130, 330, 930, 1330, 1130 is lowered.

Advantageously, the energy storage and delivery system 100-100D, 1430, 1440 can, for example, store electricity generated from solar power as potential energy in the raised blocks 130, 330, 930, 1330, 1130 during daytime hours when solar power is available, and can convert the potential energy in the blocks 130, 330, 930, 1330, 1130 into electricity during nighttime hours when solar energy is not available by lowering one or more blocks 130, 330, 930, 1330, 1130 and deliver the converted electricity to the power grid.

Described herein are examples of an energy storage and delivery system (e.g., the energy storage and delivery system 100-100D, 1430, 1440) operable to convert electrical energy or electricity into potential energy for storage, and to convert potential energy into electrical energy or electricity, for example, for delivery to an electrical grid. Advantageously, the energy storage system requires little to no maintenance, and can operate decades (e.g., 30-50 years) with substantially no reduction in energy storage capacity.

In some implementations, the energy storage system described herein can store approximately 10 megawatts-hour (MWh) or more of energy (e.g., between 10 MWh and 100 MWh, such as 15 MWh, 20 MWh, 30 MWh, 50 MWh, 80 MWh, 90 MWh) and deliver approximately 10 MWh or more of energy (e.g., between 10 MWh and 100 MWh, such as 15 MWh, 20 MWh, 30 MWh, 50 MWh, 80 MWh, 90 MWh) to the electrical grid. The energy storage system described herein can deliver energy each hour (e.g., 1 MW up to 6 MW or more). However, in other implementations the energy storage and delivery system described herein can have other suitable energy storage and delivery capacities (e.g., 1 MWh, 3 MWh, 5 MWh, etc.). In one implementation, the energy storage and delivery system can optionally power approximately 1000 homes or more for a day.

The energy storage and delivery system described herein can advantageously be connected to a renewable energy (e.g., green energy) power generation system, such as, for example, a solar power energy system, a wind energy power system (e.g., wind turbines), etc. Advantageously, during operation of the renewable energy power generation system (e.g., operation of the solar energy system during daylight hours, operation of the wind power system during windy conditions), the energy storage and delivery system captures the electricity generated by the renewable energy power generation system. The energy storage and delivery system can later deliver the stored electricity to the electrical grid when the renewable energy power generation system is not operable (e.g., at night time, during windless conditions). Accordingly, the energy storage and delivery system operates like a battery for the renewable energy power generation system and can deliver off-hours electricity from a renewable energy power generation system to the electrical grid.

In implementations described above, the energy storage and delivery system 100-100D, 1430, 1440 lifts blocks 130, 330, 930, 1330, 1130 to store electrical energy as potential energy and lowers blocks 130, 330, 930, 1330, 1130 to generate electricity. In one implementation, the elevator 120, 320, 820, 922, 1322, 1120 can be operated with excess power from an electricity grid. The amount of energy recovered by the energy storage system 100-100D, 1430, 1440 for every unit of energy used to lift the blocks 130, 330, 930, 1330, 1130 can optionally be 80-90%.

Additional Embodiments

In embodiments of the present invention, an energy storage system, a method of operating the same, and a block for use with the same, may be in accordance with any of the following clauses:

Clause 1. An energy storage and delivery system, comprising:

one or more modules, each module comprising
a plurality of blocks, and
a frame having a vertical height above a foundation, the frame including
an elevator shaft,
an elevator movably disposed in the elevator shaft, the elevator sized to receive and support one or more blocks therein and operable to move one or more of the plurality of blocks between a lower elevation and a higher elevation, and
a winch assembly movably coupled to a cable that is coupled to the elevator, the winch assembly comprising one or more planetary gear assemblies, one or more brakes and a spool coupled to the cable;
a motor-generator; and
a drive shaft having an end coupled to the motor-generator and an opposite end coupled to the winch assembly, wherein at least one of the one or more brakes of the winch assembly is operable so that the spool rotates to reel-in the cable to raise the elevator to move one or more of the plurality of blocks from a lower elevation to a higher elevation to store energy or so that the spool rotates to reel-out the cable to lower the elevator to move one or more of the plurality of blocks from a higher elevation to a lower elevation to generate electricity.

Clause 2. The system of clause 1, wherein the winch assembly comprises a brake disc concentric with the drive shaft and wherein the one or more planetary gear assemblies includes a first planetary gear assembly and a second planetary gear assembly, the first planetary gear assembly disposed axially between the brake disc and the second planetary gear assembly, the second planetary gear assembly disposed axially between the first planetary gear assembly and the spool, the first planetary gear assembly including a first sun gear, a first pair of planet gears, and a first ring gear, the second planetary gear assembly including a second sun gear, a second pair of planet gears and a second ring gear, the drive shaft fixedly coupled to the first sun gear, the second sun gear and the spool, the brake disc fixedly coupled to the first pair of planet gears, and the first ring gear fixedly coupled to the second pair of planet gears.

Clause 3. The system of clause 2, wherein the one or more brakes includes a first brake operable to selectively engage the brake disc, a second brake operable to selectively engage the first ring gear and a third brake operable to selectively engage the second ring gear.

Clause 4. The system of clause 3, wherein operating the first brake to disengage the brake disc, operating the second brake to disengage the first ring gear, and operating the third brake to engage the second ring gear stops rotation of the spool.

Clause 5. The system of any of clauses 3-4, wherein operating the first brake to engage the brake disc, operating the second brake to disengage the first ring gear, and operating the third brake to disengage the second ring gear rotates the spool in a reverse direction to reel-out the cable to lower the elevator.

Clause 6. The system of any of clauses 3-5, wherein operating the first brake to disengage the brake disc, operating the second brake to engage the first ring gear, and operating the third brake to disengage the second ring gear rotates the spool in a forward direction to reel-in the cable to raise the elevator.

Clause 7. The system of any preceding clause, further comprising a damper coupled to the cable, the damper configured to absorb at least a portion of a force applied to the cable.

Clause 8. The system of any preceding clause, further comprising a linear actuator coupled to the cable, the linear actuator configured to expand or contract to allow adjustment in a vertical position of the elevator to facilitate picking-up or dropping-off of the block.

Clause 9. The system of any preceding clause, wherein the one or more modules are two modules, and wherein the drive shaft couples to the winch of a first of the two modules and to the winch of the second of the two modules.

Clause 10. The system of clause 9, wherein the winch of the first module and the winch of the second module are operable to simultaneously lift a block in the first module and lower a block in the second module.

Clause 11. The system of any preceding clause, wherein the frame has a lower deck and an upper deck spaced vertically above the lower deck, and wherein the elevator shaft is disposed between a left column and a right column of the frame that extend between the lower deck and the upper deck.

Clause 12. The system of clause 11, wherein the elevator is operable to raise one or more blocks from a location in the left column above the lower deck to a location above the upper deck over the left column and to move one or more blocks from a location in the right column above the lower deck to a location above the upper deck over the right column to thereby store an amount of electrical energy corresponding to a potential energy amount of said one or more raised blocks, and wherein the elevator is operable to lower one or more blocks from a location above the upper deck over the left column to a location within the left column above the lower deck and to move one or more blocks from a location above the upper deck over the right column to a location within the right column above the lower deck under a force of gravity to thereby generate an amount of electricity for each of the one or more lowered blocks via the electric motor-generator electrically coupled to the elevator.

Clause 13. The system of clause 11, wherein the elevator is operable to move the plurality of blocks between the location above the lower deck and the location above the upper deck so that the average distribution of load on the frame or the foundation of the module remains substantially constant.

Clause 14. The system of any preceding clause, wherein the frame includes a plurality of columns of reinforced steel and concrete pillars.

Clause 15. A method for storing and generating electricity, comprising:

operating an elevator along an elevator shaft to move a plurality of blocks between a lower elevation and a higher elevation, the elevator coupled to a cable that extends between the elevator and a spool of a winch assembly, the winch assembly comprising one or more planetary gear assemblies and one or more brakes, wherein operating the elevator includes:

operating a first brake of the winch assembly to disengage a brake disc of the winch assembly, operating a second brake of the winch assembly to disengage a first ring gear of a first planetary gear assembly and operating a third brake of the winch assembly to engage a second ring gear of a second planetary gear assembly to stop rotation of the spool, operating the first brake to engage the brake disc of the winch assembly, operating the second brake to disengage the first ring gear of the first planetary gear assembly and operating the third brake to disengage the second ring gear of the second planetary gear assembly to rotate the spool in a reverse direction to reel-out the cable to lower the elevator, and operating the first brake to disengage the brake disc of the winch assembly, operating the second brake to engage the first ring gear of the first planetary gear assembly and operating the third brake to disengage the second ring gear of the second planetary gear assembly to rotate the spool in a forward direction to reel-in the cable to raise the elevator.

Clause 16. The method of clause 15, wherein moving the blocks between the lower elevation and the higher elevation includes moving the blocks between a location above a lower deck in a left or a right column on either side of the elevator shaft to location above an upper deck aligned with the left or right columns.

Clause 17. The method of clause 16, wherein moving the one or more blocks between the location above the lower deck in the left or right columns and the location above the upper deck in the left or right columns includes positioning the blocks so that the average distribution of load on a foundation under the frame or on the frame remains substantially constant.

While certain embodiments of the inventions have been described, these embodiments have been presented by way of example only, and are not intended to limit the scope of the disclosure. Indeed, the novel methods and systems described herein may be embodied in a variety of other forms. Furthermore, various omissions, substitutions and changes in the systems and methods described herein may be made without departing from the spirit of the disclosure. The accompanying claims and their equivalents are intended to cover such forms or modifications as would fall within the scope and spirit of the disclosure. Accordingly, the scope of the present inventions is defined only by reference to the appended claims.

Features, materials, characteristics, or groups described in conjunction with a particular aspect, embodiment, or example are to be understood to be applicable to any other aspect, embodiment or example described in this section or elsewhere in this specification unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The protection is not restricted to the details of any foregoing embodiments. The protection extends to any novel one, or any novel combination, of the features disclosed in this specification (including any accompanying claims, abstract and drawings), or to any novel one, or any novel combination, of the steps of any method or process so disclosed.

Furthermore, certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as a subcombination or variation of a subcombination.

Moreover, while operations may be depicted in the drawings or described in the specification in a particular order, such operations need not be performed in the particular order shown or in sequential order, or that all operations be performed, to achieve desirable results. Other operations that are not depicted or described can be incorporated in the example methods and processes. For example, one or more additional operations can be performed before, after, simultaneously, or between any of the described operations. Further, the operations may be rearranged or reordered in other implementations. Those skilled in the art will appreciate that in some embodiments, the actual steps taken in the processes illustrated and/or disclosed may differ from those shown in the figures. Depending on the embodiment, certain of the steps described above may be removed, others may be added. Furthermore, the features and attributes of the specific embodiments disclosed above may be combined in different ways to form additional embodiments, all of which fall within the scope of the present disclosure. Also, the separation of various system components in the implementations described above should not be understood as requiring such separation in all implementations, and it should be understood that the described components and systems can generally be integrated together in a single product or packaged into multiple products.

For purposes of this disclosure, certain aspects, advantages, and novel features are described herein. Not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Conditional language, such as "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than 10% of, within less than 5% of, within less than 1% of, within less than 0.1% of, and within less than 0.01% of the stated amount. As another example, in certain embodiments, the terms "generally parallel" and "substantially parallel" refer to a value, amount, or characteristic that departs from exactly parallel by less than or equal to 15 degrees, 10 degrees, 5 degrees, 3 degrees, 1 degree, or 0.1 degree.

The scope of the present disclosure is not intended to be limited by the specific disclosures of preferred embodiments in this section or elsewhere in this specification, and may be defined by claims as presented in this section or elsewhere in this specification or as presented in the future. The language of the claims is to be interpreted broadly based on the language employed in the claims and not limited to the examples described in the present specification or during the prosecution of the application, which examples are to be construed as non-exclusive.

What is claimed is:

1. An assembly for use in an energy storage and delivery system, comprising:

a planetary gear assembly including a first set of planetary gears and a second set of planetary gears, the second set of planetary gears disposed axially between the first set of planetary gears and a cable, the first set of planetary gears including a first sun gear, a first pair of planet gears, and a first ring gear, the second set of planetary gears including a second sun gear, a second pair of planet gears, and a second ring gear;

a brake disc coupled to the first set of planetary gears; and a plurality of brakes including a first brake operable to engage the brake disc, a second brake operable to engage the first set of planetary gears, and a third brake operable to engage the second set of planetary gears;

wherein operating the first brake to disengage the brake disc, operating the second brake to engage the first ring gear, and operating the third brake to disengage the second ring gear allows the cable to move in a first direction; and wherein operating the first brake to engage the brake disc, operating the second brake to disengage the first ring gear, and operating the third brake to disengage the second ring gear allows the cable to move in a second direction opposite the first direction.

2. The assembly of claim 1, wherein operating the first brake to disengage the brake disc, operating the second brake to disengage the first ring gear, and operating the third brake to engage the second ring gear stops the cable from moving in the first direction or the second direction.

3. The assembly of claim 1, wherein the first pair of planet gears are arranged between the first sun gear and the first ring gear.

4. The assembly of claim 1, wherein the second pair of planet gears are arranged between the second sun gear and the second ring gear.

5. The assembly of claim 1, wherein the brake disc is coupled to the first pair of planet gears so that the brake disc rotates at a same speed as the first pair of planet gears.

6. The assembly of claim 1, wherein the first ring gear is coupled to the second pair of planet gears so that the first ring gear rotates at a same speed as the second pair of planet gears.

7. The assembly of claim 1, further comprising a drive shaft having an end coupled to a motor-generator, the motor-generator operable to deliver energy to a power grid.

8. The assembly of claim 7, wherein the brake disc is concentric with the drive shaft.

9. The assembly of claim 1, wherein one or more of the first brake, the second brake, and the third brake are pneumatically operated brakes.

10. The assembly of claim 1, further comprising a damper coupled to the cable, the damper configured to absorb forces applied to the cable.

11. The assembly of claim 1, further comprising a motor-generator, an elevator shaft, and an elevator movably disposed in the elevator shaft, the elevator configured to support one or more blocks.

12. An assembly for use in an energy storage and delivery system, comprising:

a planetary gear assembly including a first set of planetary gears and a second set of planetary gears, the second set of planetary gears disposed axially between the first set of planetary gears and a cable, the first set of planetary gears including a first sun gear, a first pair of planet gears, and a first ring gear, the second set of planetary gears including a second sun gear, a second pair of planet gears, and a second ring gear;

a brake disc coupled to the first set of planetary gears; and a plurality of brakes including a first brake operable to engage the brake disc, a second brake operable to engage the first set of planetary gears, and a third brake operable to engage the second set of planetary gears;

wherein translation of the cable in a first direction lifts one or more blocks from a lower elevation to a higher elevation to store energy; and wherein translation of the cable in a second direction opposite the first direction lowers the one or more blocks from a higher elevation to a lower elevation to generate energy.

13. The assembly of claim 12, wherein engagement of one or more of the first brake, the second brake, and the third brake and disengagement of one or more of the first brake, the second brake, and the third brake allows movement of the cable in the first direction, allows movement of the cable in the second direction opposite the first direction, or stops a movement of the cable.

14. The assembly of claim 12, wherein operating the first brake to disengage the brake disc, operating the second brake to disengage the first ring gear, and operating the third brake to engage the second ring gear stops movement of the cable.

15. The assembly of claim 12, further comprising a drive shaft having an end coupled to a motor-generator.

16. The assembly of claim 15, wherein the motor-generator is configured to output and receive power concurrently.

17. The assembly of claim 12, wherein the first ring gear is coupled to the second pair of planet gears so that the first ring gear rotates at a same speed as the second pair of planet gears.

18. An assembly for use in an energy storage and delivery system, comprising:

a planetary gear assembly including a first set of planetary gears and a second set of planetary gears, the second set of planetary gears disposed axially between the first set of planetary gears and a cable, the first set of planetary gears including a first sun gear, a first pair of planet gears, and a first ring gear, the second set of planetary gears including a second sun gear, a second pair of planet gears, and a second ring gear;

a brake disc coupled to the first set of planetary gears; and a plurality of brakes including a first brake operable to engage the brake disc, a second brake operable to engage the first set of planetary gears, and a third brake operable to engage the second set of planetary gears.

19. The assembly of claim 18, further comprising a drive shaft having an end coupled to a motor-generator.

20. The assembly of claim 19, wherein the motor-generator is configured to output and receive power concurrently.

* * * * *